United States Patent
Fujiwara

(10) Patent No.: US 12,168,739 B2
(45) Date of Patent: Dec. 17, 2024

(54) METHOD OF MANUFACTURING ADHESIVE MEMBER, METHOD OF MANUFACTURING DISPLAY DEVICE INCLUDING THE SAME, AND DISPLAY DEVICE MANUFACTURED BY THE METHOD OF MANUFACTURING DISPLAY DEVICE

(71) Applicant: SAMSUNG DISPLAY CO., LTD., Yongin-si (KR)

(72) Inventor: Tetsuya Fujiwara, Yokohma (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 236 days.

(21) Appl. No.: 17/813,924

(22) Filed: Jul. 20, 2022

(65) Prior Publication Data
US 2023/0159801 A1 May 25, 2023

(30) Foreign Application Priority Data
Nov. 25, 2021 (KR) .................. 10-2021-0164273

(51) Int. Cl.
*G02B 1/14* (2015.01)
*C09J 7/22* (2018.01)
(Continued)

(52) U.S. Cl.
CPC .............. *C09J 133/10* (2013.01); *C09J 7/22* (2018.01); *C09J 175/04* (2013.01); *G02B 1/14* (2015.01); *C09J 2203/326* (2013.01); *C09J 2301/408* (2020.08); *C09J 2301/416* (2020.08); *G06F 1/1652* (2013.01)

(58) Field of Classification Search
CPC ....................................................... G02B 1/14
See application file for complete search history.

(56) References Cited

U.S. PATENT DOCUMENTS

| | | | |
|---|---|---|---|
| 9,469,475 B2 | 10/2016 | Ogawa et al. | |
| 2017/0121664 A1 | 5/2017 | Cho et al. | |
| (Continued) | | | |

FOREIGN PATENT DOCUMENTS

| | | | |
|---|---|---|---|
| EP | 2767970 A1 * | 8/2014 | |
| JP | 5370706 | 12/2013 | |
| (Continued) | | | |

*Primary Examiner* — Jeffry H Aftergut
(74) *Attorney, Agent, or Firm* — F. CHAU & ASSOCIATES, LLC

(57) ABSTRACT

A method of manufacturing an adhesive member includes providing, for a substrate, a resin composition having a viscosity of about 5 cP to about 50 cP, as measured according to JISK2283 method, at about 25° C. The resin composition is exposed to a first light to form a preliminary adhesive member having a curing rate of about 80% to about 98%. The preliminary adhesive member is exposed to a second light having a light integral/dose that is more than that of the first light to form an adhesive member. The preliminary adhesive member may have a loss tangent (tan δ) of about 0.2 to about 0.6 and may have a glass transition temperature of about −70° C. to −30° C. Accordingly, the preliminary adhesive member and adhesive member formed by the method of manufacturing an adhesive member may exhibit increased reliability.

14 Claims, 11 Drawing Sheets

(51) Int. Cl.
    *C09J 133/10*     (2006.01)
    *C09J 175/04*     (2006.01)
    *G06F 1/16*     (2006.01)

(56) References Cited

U.S. PATENT DOCUMENTS

| | | | |
|---|---|---|---|
| 2021/0008791 A1 | 1/2021 | Kunihiro et al. | |
| 2021/0355354 A1* | 11/2021 | Yamamoto | C09J 151/003 |

FOREIGN PATENT DOCUMENTS

| | | |
|---|---|---|
| JP | 5826639 | 12/2015 |
| JP | 2017095659 | 6/2017 |
| JP | 6185122 | 8/2017 |
| JP | 2018045213 | 3/2018 |
| JP | 2019061323 | 4/2019 |
| JP | 6523098 | 5/2019 |
| JP | 6528103 | 6/2019 |
| JP | 2019089975 | 6/2019 |
| JP | 2019099714 | 6/2019 |
| JP | 2020-105626 | 7/2020 |
| JP | 2021050290 | 4/2021 |
| KR | 10-2020-0139623 | 12/2020 |

* cited by examiner

METHOD OF MANUFACTURING ADHESIVE MEMBER, METHOD OF MANUFACTURING DISPLAY DEVICE INCLUDING THE SAME, AND DISPLAY DEVICE MANUFACTURED BY THE METHOD OF MANUFACTURING DISPLAY DEVICE

CROSS-REFERENCE TO RELATED APPLICATION

This U.S. non-provisional patent application claims priority under 35 U.S.C. § 119 to Korean Patent Application No. 10-2021-0164273, filed on Nov. 25, 2021, the entire contents of which are hereby incorporated by reference.

TECHNICAL FIELD

The present disclosure herein relates to a method of manufacturing an adhesive member including forming a preliminary adhesive member, a method of manufacturing a display device including the same, and a display device manufactured by the method of manufacturing the display device.

DISCUSSION OF THE RELATED ART

Various display devices are being developed for use in multimedia devices such as televisions, mobile phones, tablet computers, navigation systems, and game consoles, etc. Recently, display devices are being developed that are capable of being folded, bent, and/or rolled. Such display devices may be used to provide multimedia devices that are easier to carry while still providing a large display screen.

SUMMARY

A method of manufacturing an adhesive member includes providing, on a substrate, a resin composition having a viscosity of about 5 cP to about 50 cP, as measured according to the JISK2283 method, at about 25° C. The resin composition is exposed to a first light to form a preliminary adhesive member having a curing rate of about 80% to about 98%. The resin is exposed to a second light having a light integral/dose that is greater than that of the first light to form an adhesive member. The preliminary adhesive member has a loss tangent (tan δ) of about 0.2 to about 0.6, and the adhesive member has a glass transition temperature of about −70° C. to about −30° C.

The resin composition may be provided by an inkjet printing method or a dispensing method.

The resin composition may include at least one (meth)acrylate monomer containing a (meth)acryloyl group, at least one urethane (meth)acrylate oligomer, and at least one photoinitiator.

The curing rate of the preliminary adhesive member may satisfy Equation 1 below:

$$Z_1 = [(X_1 - Y_1)/X_1] \times 100\% \quad \text{[Equation 1]}$$

In Equation 1 above, $X_1$ is an absorption amount of the (meth)acryloyl group measured by Fourier-transform infrared spectroscopy (FT-IR) in the resin composition, $Y_1$ is an absorption amount of the (meth)acryloyl group as measured by FT-IR in the preliminary adhesive member, and $Z_1$ is the curing rate of the preliminary adhesive member.

A weight average molecular weight of the (meth)acrylate monomer may be about 100 to about 500.

A weight average molecular weight of the urethane (meth)acrylate oligomer may be about 10,000 to about 40,000.

The urethane (meth)acrylate oligomer may include a plurality of acrylic groups.

The photoinitiator may include a radical polymerization initiator.

A light integral of the first light may be about 200 mJ/cm² to about 1,000 mJ/cm², and a light integral of the second light may be about 3,500 mJ/cm² to about 4,500 mJ/cm².

The adhesive member may have a 180 degree peel strength of about 800 gf/25 mm or more with respect to a polymer substrate.

The adhesive member may have a curing rate of greater than 90%.

A method of manufacturing a display device includes providing, on a substrate, a resin composition having a viscosity of about 5 cP to about 50 cP, as measured according to the JISK2283 method, at about 25° C. The resin composition is exposed to a first light to form a preliminary adhesive member having a curing rate of about 80% to about 98%. A protective member is disposed on the preliminary adhesive member. The preliminary adhesive member is exposed to a second light having a light integral that is greater than that of the first light to form an adhesive member. The preliminary adhesive member has a loss tangent (tan δ) of about 0.2 to about 0.6, and the adhesive member has a glass transition temperature of about −70° C. to about −30° C.

The second light may pass through the protective member and be provided to the preliminary adhesive member.

The resin composition may include at least one (meth)acrylate monomer, at least one urethane (meth)acrylate oligomer, and at least one photoinitiator.

A display device includes a display panel. A protective member is disposed on the display panel. An adhesive member is disposed between the display panel and the protective member and includes a polymer derived from a resin composition having a viscosity of about 5 cP to about 50 cP, as measured according to the JISK2283 method, at about 25° C. The resin composition includes at least one (meth)acrylate monomer, at least one urethane (meth)acrylate oligomer, and at least one photoinitiator. When the resin composition includes one urethane (meth)acrylate oligomer, the one urethane (meth)acrylate oligomer is included in 10 wt % or more with respect to a total weight of the resin composition, and the adhesive member has a 180 degree peel strength of about 800 gf/25 mm or more with respect to a polymer substrate and has a glass transition temperature of about −70° C. to about −30° C.

The protective member may include a window.

The resin composition may be provided on one surface of the display panel or on one surface of the protective member, and the adhesive member may be formed by photo-curing the resin composition.

The display device may include at least one folding region, and the folding region may have a radius of curvature of about 5 mm or less.

The display device may further include a light control layer disposed between the adhesive member and the protective member and an optical adhesive layer disposed between the light control layer and the protective member, and the optical adhesive layer may include a polymer derived from the resin composition.

The light control layer may be a polarization plate or a color filter layer.

In an embodiment, the optical adhesive layer may have a 180 degree peel strength of 800 gf/25 mm with respect to a polymer substrate and have a glass transition temperature of about −70° C. to about −30° C.

In an embodiment, the display device may further include an input sensing unit disposed on the display panel, and the adhesive member may be disposed between the display panel and the input sensing unit or between the input sensing unit and the protective member.

BRIEF DESCRIPTION OF THE FIGURES

The accompanying drawings are included to provide a further understanding of the inventive concept and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
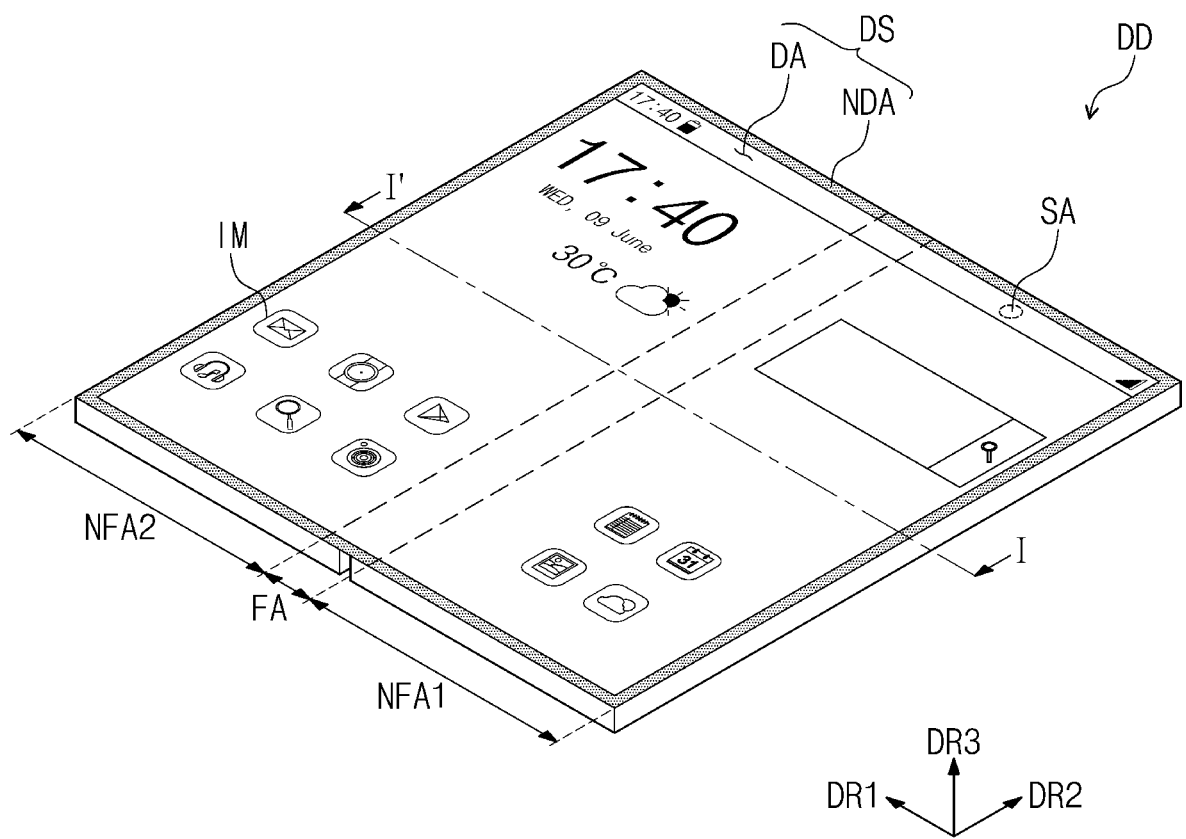
FIG. 1A is a perspective view illustrating a display device of an embodiment of the inventive concept.

The inventive concept may be modified in many alternate forms, and thus specific embodiments will be exemplified in the drawings and described in detail.

In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Like reference numerals may refer to like components throughout the specification and the drawings. It is noted that while the drawings are intended to illustrate actual relative dimensions of a particular embodiment of the specification, the present invention is not necessarily limited to the embodiments shown. The term "and/or" includes all combinations of one or more of which associated configurations may define.

It will be understood that, although the terms "first," "second," etc. may be used herein to describe various components, these components should not necessarily be limited by these terms. These terms are used to distinguish one component from another. For example, a first component could be termed a second component, and, similarly, a second component could be termed a first component, without departing from the scope of the inventive concept. The terms of a singular form may include plural forms unless the context clearly indicates otherwise.

In addition, terms such as "below," "under," "on," and "above" may be used to describe the relationship between components illustrated in the figures. The terms are used as a relative concept and are described with reference to the direction indicated in the drawings.

It should be understood that the terms "comprise," "include," or "have" are intended to specify the presence of stated features, integers, steps, operations, components, parts, or combinations thereof in the disclosure, but do not preclude the presence or addition of one or more other features, integers, steps, operations, components, parts, or combinations thereof.

Hereinafter, a display device of an embodiment, a method of manufacturing a display device, and a method of manufacturing an adhesive member will be described with reference to the accompanying drawings.

Figure 1B:
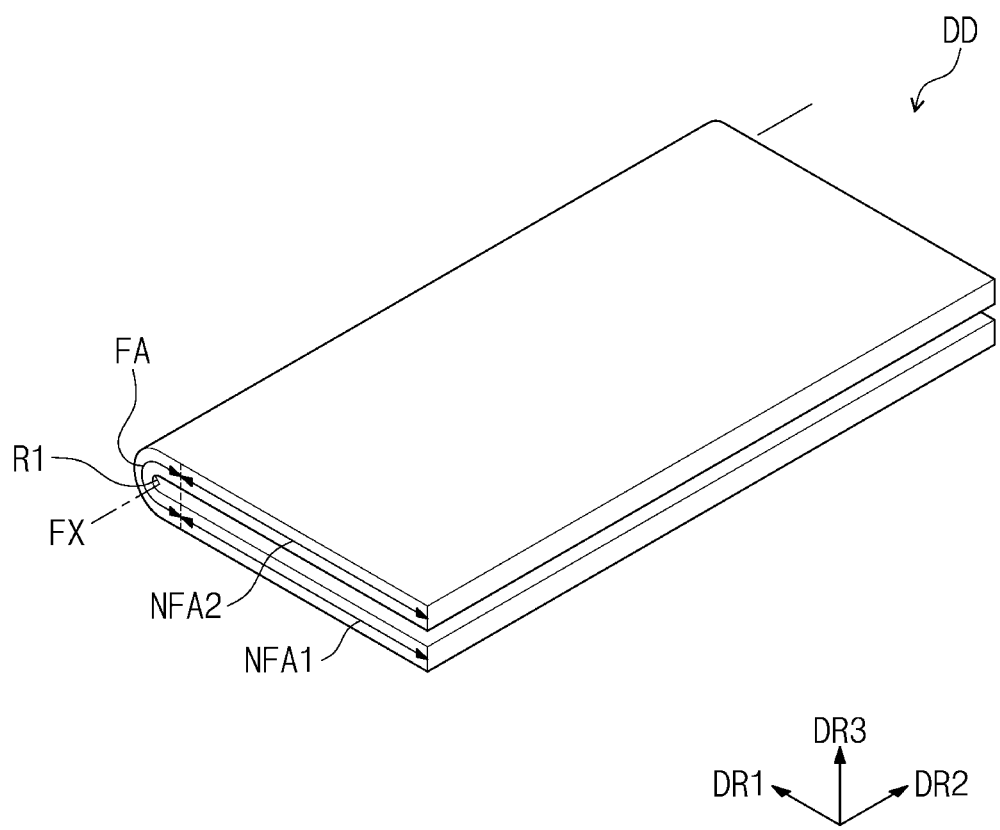
FIG. 1B is a perspective view illustrating a folded state of the display device illustrated in FIG. 1A.

FIG. 1A is a perspective view of a display device according to an embodiment. FIG. 1B is a view illustrating a folded state of the display device illustrated in FIG. 1A.

The display device DD, according to an embodiment, may be a flexible display device which may be folded or bent or may be maintained in a folded state or bent state. In the description, the term "flexible" means bendable characteristics, and is not necessarily limited to a structure in which the device is bent and fully folded but may include a structure that is bent up to a level of several nanometers (nm).

Referring to FIGS. 1A and 1B, a display device DD may be a device that is activated according to an electrical signal. For example, the display device DD may be a portable electronic device, a personal digital terminal, a tablet computer, a car navigation unit, a game console, or a wearable device, but the embodiment of the inventive concept is not necessarily limited thereto. FIGS. 1A and 1B exemplarily illustrate that the display device DD is a portable electronic device.

Referring to FIG. 1A, the display device DD according to an embodiment may include a display surface DS defined by a first directional axis DR1 and a second directional axis DR2 crossing the first directional axis DR1. The display device DD may provide an image IM for a user through the display surface DS.

The display surface DS may include a display region DA and a non-display region NDA adjacent to the display region DA. The display region DA may display the image IM and the non-display region NDA might not display the image IM. The non-display region NDA may at least partially surround the display region DA. However, the embodiment of the inventive concept is not necessarily limited thereto, and the shape of the display region DA and the shape of the non-display region NDA may vary from what is shown.

The display surface DS may further include a sensing region SA. The sensing region SA may be a portion of the display region DA. The sensing region SA may have a transmittance of light that is higher than that of the display region DA. A light signal, for example, visible light or infrared light may move through the sensing region SA. The display device DD may include an electronic module that captures an external image through the visible light passing through the sensing region SA, or determines, through the infrared light, the access of an external object. FIG. 1A exemplarily illustrates the single sensing region SA, but the embodiment of the inventive concept is not necessarily limited thereto, and the sensing region SA may be provided in plural.

The display device DD may have a thickness direction that is parallel to a third directional axis DR3 that is the normal direction with respect to a plane defined by the first directional axis DR1 and the second directional axis DR2. The directions indicated by the first to third directional axes DR1, DR2, and DR3 as described in the specification are relative concepts and may thus be changed to other directions. In addition, the directions indicated by the first to third direction axes DR1, DR2 and DR3 may be described as first to third directions, and the same reference symbols may be used. In the specification, the first directional axis DR1 and the second directional DR2 are orthogonal with respect to each other, and the third directional axis DR3 may be the normal direction with respect to the plane defined by the first directional axis DR1 and the second directional axis DR2.

The display device DD may include a folding region FA and a plurality of non-folding regions NFA1 and NFA2. The non-folding regions NFA1 and NFA2 may include a first non-folding region NFA1 and a second non-folding region NFA2. A first non-folding region NFA1, a folding region FA, and a second non-folding region NFA2 may be disposed in this order in the first directional axis DR1 (e.g., with the folding region FA being disposed between the first non-folding region NFA1 and the second non-folding region NFA2).

FIGS. 1A and 1B illustrate that the display device DD includes one folding region FA and two non-folding regions NFA1 and NFA2, but the number of folding and non-folding regions is not necessarily limited thereto. For example, the display device may include three or more non-folding regions and two or more folding regions disposed between adjacent non-folding regions.

As illustrated in FIG. 1B, the folding region FA may be folded with respect to a folding axis FX in parallel with the second directional axis DR2. The folding region FA may have a preset curvature and radius of curvature (R1). For example, the folding region FA may have a radius of curvature R1 of about 5 mm or less.

When the display device DD is folded, the non-folding regions NFA1 and NFA2 may face each other. In a fully folded state of the display device DD, the display surface DS might not be exposed to the outside, which may be referred to as inner-folding. In a fully folded state of the display device DD of an embodiment, the display surface DS may be exposed to the outside, which may be referred to as outer-folding.

Figure 2:
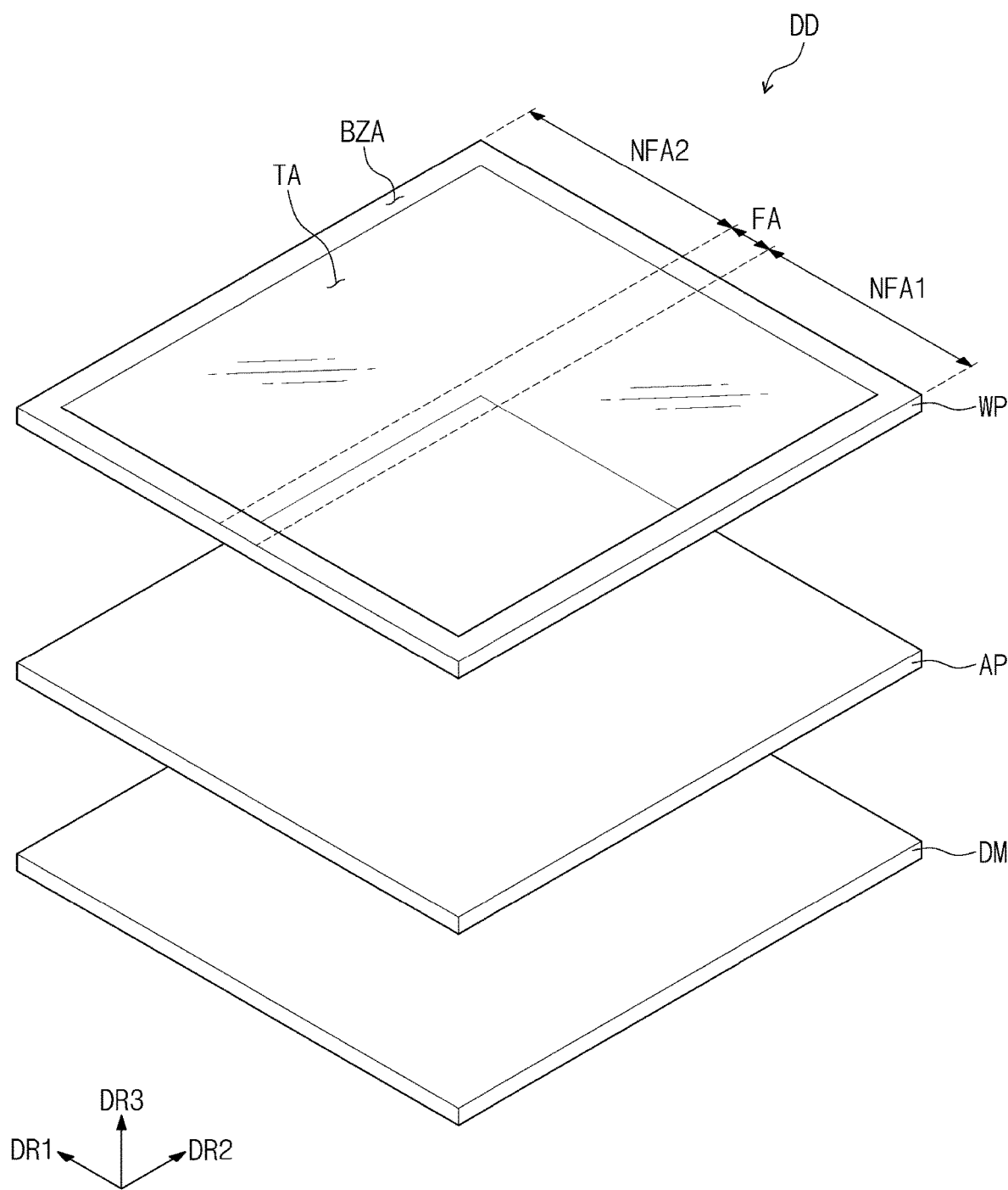
FIG. 2 is an exploded perspective view of a display device of an embodiment of the inventive concept.
Figure 3:
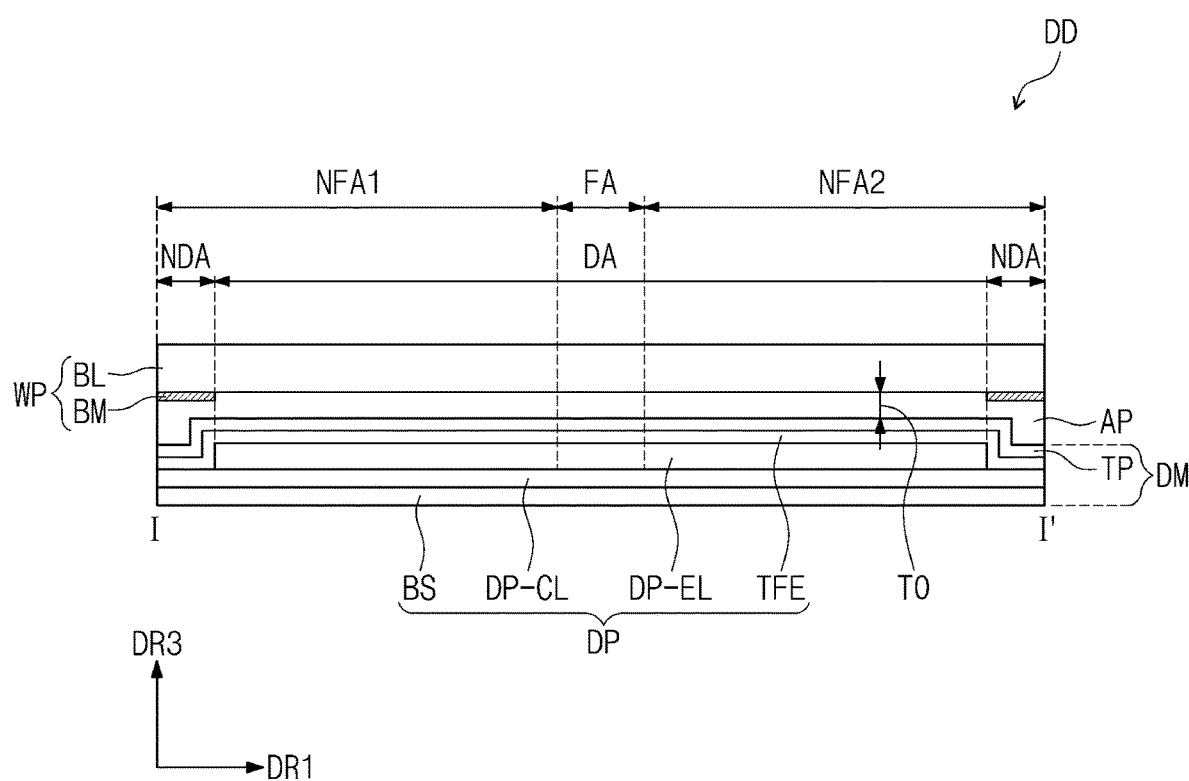
FIG. 3 is a cross-sectional view of a display device of an embodiment of the inventive concept.

FIG. 2 is an exploded perspective view of a display device DD according to an embodiment. FIG. 3 illustrates a portion corresponding to line I-I' of FIG. 1A and is a cross-sectional view of the display device DD according to an embodiment.

The display device DD of an embodiment may include a display module DM and a protective member WP disposed on the display module DM. In the display device DD of an embodiment, the display module DM may include a display panel DP including a display element layer DP-EL, and an input sensing unit TP disposed on the display panel DP. The display device DD of an embodiment may include an adhesive member AP disposed between the display panel DP and the protective member WP. The display device DD may be formed by a method of manufacturing a display device of an embodiment, which will be described later. The method of manufacturing a display device of an embodiment will be described in more detail with reference to FIGS. 6 to 7C.

The display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL.

The configuration of the display panel DP illustrated in FIG. 3, etc. is exemplary, and the configuration of the display panel DP is not necessarily limited thereto. For example, the display panel DP may include a liquid crystal display element, and in this case, the encapsulation layer TFE may be omitted.

The input sensing unit TP may be disposed on the display panel DP. For example, the input sensing unit TP may be disposed directly on the encapsulation layer TFE of the display panel DP. The input sensing unit TP may detect an external input, convert the external input to a predetermined input signal, and provide the input signal for the display panel DP. For example, in the display device DD of an embodiment, the input sensing unit TP may be a touch sensing unit that senses a touch. The input sensing unit TP may recognize a user's direct touch, a user's indirect touch, a direct touch of an object, or an indirect touch of an object.

The input sensing unit TP may sense a location and/or force (pressure) of the externally applied touch. The input sensing unit TP in an embodiment may have various structures or may be formed of various materials and is not necessarily limited to any one embodiment. The input sensing unit TP may include a plurality of sensing electrodes so as to sense an external input. The sensing electrodes may sense the external input in a capacitive manner. The display panel DP may receive an input signal from the input sensing unit TP and generate an image corresponding to the input signal.

In an embodiment, the protective member WP may include a window. The protective member WP may protect the display panel DP, the input sensing unit TP, and the like. The image IM generated in the display panel DP may be provided to a user by passing through the protective member WP. The protective member WP may provide a touch surface of the display device DD. In the display device DD including the folding region FA, the protective member WP may include a flexible window.

The protective member WP may include a base layer BL and a printing layer BM. The protective member WP may include a transmission region TA and a bezel region BZA. The front surface of the protective member WP including the transmission region TA and the bezel region BZA may correspond to the front surface of the display device DD.

The transmission region TA may be an optically clear region. The bezel region BZA may have light transmittance that is lower than that of the transmission region TA. The bezel region BZA may have a certain color. The bezel region BZA may be adjacent to the transmission region TA and may at least partially surround the transmission region TA. The bezel region BZA may define the shape of the transmission region TA. However, the embodiment of the inventive concept is not necessarily limited to the one illustrated, the bezel region BZA may be disposed adjacent to only one side of the transmission region TA, and a part thereof may be omitted.

The base layer BL may be a glass or plastic substrate. For example, a tempered glass substrate may be used in the base layer BL. Alternatively, the base layer BL may be formed of a flexible polymer resin. For example, the base layer BL may be formed of polyimide, polyacrylate, polymethylmethacrylate, polycarbonate, polyethylenenaphthalate, polyvinylidene chloride, polyvinylidene difluoride, polystyrene, ethylene-vinyl alcohol copolymer, or a combination thereof. However, the embodiment of the inventive concept is not necessarily limited thereto, and a general form known as the base layer BL of the protective member WP including the window in the art may be used without limitation.

The printing layer BM may be disposed on one surface of the base layer BL. In an embodiment, the printing layer BM may be provided on the bottom surface of the base layer BL adjacent to the display module DM. The printing layer BM may be disposed on an edge area of the base layer BL. The printing layer BM may be an ink printing layer. In addition, the printing layer BM may be a layer including a pigment or a dye. In the protective member WP, the bezel region BZA may be a portion in which the printing layer BM is provided.

The protective member WP may further include at least one functional layer provided on the base layer BL. For example, the functional layer may be a hard coating layer, an anti-fingerprint coating layer, or the like, but the embodiment of the inventive concept is not necessarily limited thereto.

For example, the adhesive layer AP may be disposed between the input sensing unit TP and the protective member WP. There may be a stepped portion between the portion in which the printing layer BM is provided and the base layer BL in which the printing layer BM is not provided. The adhesive member AP, which is formed from the resin composition according to an embodiment, has good flexibility and high adhesive strength value, and thus may adhere to the protective member WP at the stepped portion without delamination.

The thickness T0 of the adhesive member AP may be about 50 µm to about 200 µm. For example, the adhesive member AP may have a thickness T0 of about 50 µm to about 100 µm. However, this is exemplary, and the thickness T0 of the adhesive member AP is not necessarily limited thereto.

In an embodiment, the adhesive member AP may have a 180 degree peel strength of about 800 gf/25 mm or more with respect to a polymer substrate. The adhesive member AP may have a glass transition temperature (Tg) of about −70° C. to about −30° C. (exclusive of −30). For example, the adhesive member AP may have a 180 degree peel strength of about 800 gf/25 mm to about 2,000 gf/25 mm with respect to a polymer substrate. The adhesive member having a 180 degree peel strength of less than 800 gf/25 mm with respect to the polymer substrate, or a glass transition temperature of −30° C. or more may be peeled off from an adherend when repeatedly folded and unfolded. The adhesive member having a glass transition temperature of less than −70° C. is too flexible, and thus the shape might not be maintained or may be vulnerable to an impact.

In an embodiment, the adhesive member AP having a 180 degree peel strength of about 800 gf/25 mm or more with respect to the polymer substrate and a glass transition temperature of about −70° C. to about −30° C. (exclusive of −30) may exhibit high adhesive reliability and folding reliability characteristics. The display device DD including the adhesive member AP having a 180 degree peel strength of about 800 gf/25 mm or more with respect to the polymer substrate and a glass transition temperature of about −70° C. to about −30° C. (exclusive of −30) may exhibit excellent reliability.

Figure 4:
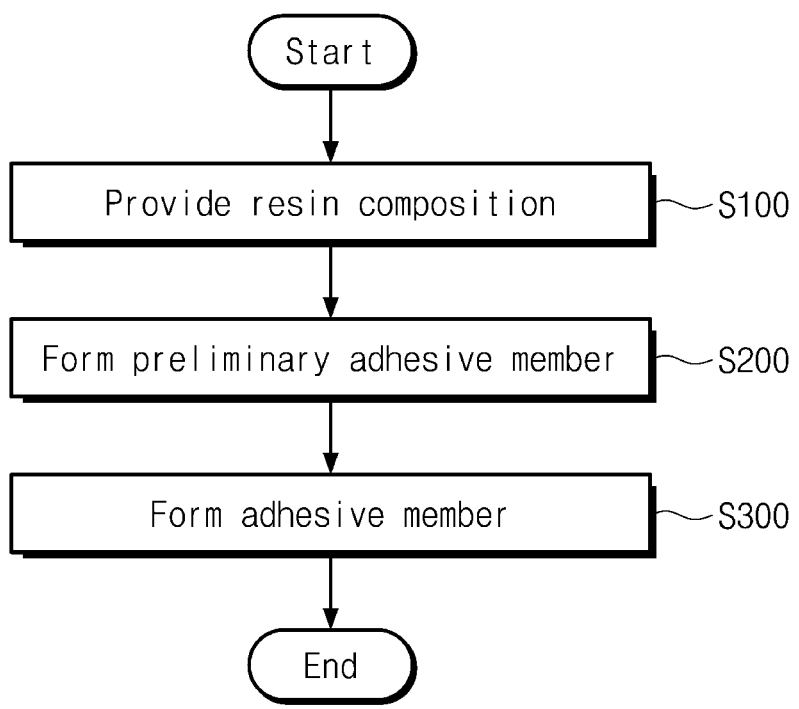
FIG. 4 is a flowchart illustrating a method of manufacturing an adhesive member according to an embodiment of the inventive concept.

The adhesive member AP may be formed by the method of manufacturing an adhesive member of an embodiment. FIG. 4 is a flowchart illustrating a method of manufacturing an adhesive member according to an embodiment. FIGS. 5A to 5D are cross-sectional views schematically illustrating an operation of the method of manufacturing an adhesive member. The method of manufacturing an adhesive member of an embodiment may include providing a resin composition (S100), forming a preliminary adhesive member from the resin composition (S200), and forming an adhesive member from the preliminary adhesive member (S300).

The adhesive member AP may be formed from the resin composition RC according to an embodiment. The resin composition RC, according to an embodiment, may include at least one (meth)acrylate monomer, at least one urethane (meth)acrylate oligomer, and at least one photoinitiator.

In the resin composition RC, the (meth)acrylate monomer may contain at least one (meth)acryloyl group. In the present specification, the term "(meth)acryloyl group" refers to either acryloyl group or methacryloyl group, and the term "(meth)acrylic" refers to either acrylic or methacrylic.

In the resin composition RC, the (meth)acrylate monomer may contain at least one acryloyl group or at least one methacryloyl group per monomer unit. For example, the (meth)acrylate monomer may be an acrylate monomer or a methacrylate monomer containing one acryloyl group or one methacryloyl group.

A weight average molecular weight (Mw) of the (meth)acrylate monomer included in the resin composition RC may be about 100 to about 500. The resin composition RC may include a plurality of (meth)acrylate monomers. For example, the resin composition RC may include two or three (meth)acrylate monomers. When the resin composition RC includes two (meth)acrylate monomers, the resin composition RC may include a (meth)acrylate monomer having a higher weight average molecular weight in more weight than a (meth)acrylate monomer having a lower weight average molecular weight. The (meth)acrylate monomer may be provided in an amount of about 75 wt % to 95 wt % with respect to a total weight of the resin composition RC. For example, the (meth)acrylate monomer may be provided in an amount of about 80 wt % to 94 wt % with respect to the total weight of the resin composition RC. However, this is exemplary, and the weight of the (meth)acrylate monomer included in the resin composition RC is not necessarily limited thereto.

The resin composition RC may include at least one of alicyclic (meth)acrylate, alkyl (meth)acrylate, or hydroxy group-containing (meth)acrylate. For example, the resin composition RC may include, as a (meth)acrylate monomer, at least one of iso-decyl acrylate, 2-ethylhexyl acrylate, or 4-hydroxybutyl acrylate. However, this is exemplary, and the (meth)acrylate monomer included in the resin composition RC is not necessarily limited thereto.

A weight average molecular weight of the urethane (meth)acrylate oligomer included in the resin composition RC may be about 10,000 to about 40,000 (exclusive of 40,000). For example, the resin composition RC may include, as a urethane (meth)acrylate oligomer, at least one of UN6207 (Negami Chemical Industrial Co., Ltd.), UN6304 (Negami Chemical Industrial Co., Ltd.), or CN9004 (ARKEMA K.K.).

The urethane (meth)acrylate oligomer included in the resin composition RC may include a plurality of acrylic groups. For example, the resin composition RC may include one or two urethane (meth)acrylate oligomers. With respect to the total weight of the resin composition RC, the urethane (meth)acrylate oligomer may be included in an amount of about 5 wt % to 15 wt %. However, this is exemplary, and the weight of the (meth)acrylate oligomer included in the resin composition RC is not necessarily limited thereto.

In an embodiment, when the resin composition RC includes one urethane (meth)acrylate oligomer, the urethane (meth)acrylate oligomer may be included in an amount of 10 wt % or more with respect to the total weight of the resin composition RC. For example, when the resin composition RC includes one urethane (meth)acrylate oligomer, the urethane (meth)acrylate oligomer may be included in an amount of about 15 wt % with respect to the total weight of the resin composition RC.

When the resin composition RC includes two urethane (meth)acrylate oligomers, the weight ratio of the two urethane (meth)acrylate oligomers may be about 1:1 to about 2:1 with respect to the total weight of the resin composition RC. However, this is exemplary, and the weight ratio of the two (meth)acrylate oligomers is not necessarily limited thereto.

The resin composition RC may include at least one photoinitiator. The photoinitiator may include a radical polymerization initiator. When the resin composition RC includes a plurality of photoinitiators, different photoinitiators may be activated by ultraviolet rays having different center wavelengths.

For example, the photoinitiator may include at least one of 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, or 2-hydroxy-1-{4-[4-(2-hydroxy-2-methyl-propionyl)-benzyl]-phenyl}-2-methylpropan-1-one.

In addition, the photoinitiator may include at least one of 2-methyl-1[4-(methylthio)phenyl]-2-morpholinopropan-1-one, 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate, bis(2,4,6-trimethylbenzoyl)-phenylphosphineoxide, 4-phenylsulfanylbenzoyl)heptylideneamino]benzoate, [1-[9-ethyl-6-(2-methylbenzoyl)carbazol-3-yl]ethylideneamino] acetate, or bis(2,4-cyclopentadienyl)bis[2,6-difluoro-3-(1-pyrryl)phenyl] titanium(IV). In addition, the resin composition RC may include, as a photoinitiator, at least one of Omnirad TPO-H (IGM Resins, Inc.), Omnirad819 (IGM Resins, Inc.), or Esacure 3644 (IGM Resins, Inc.).

Figure 5A:
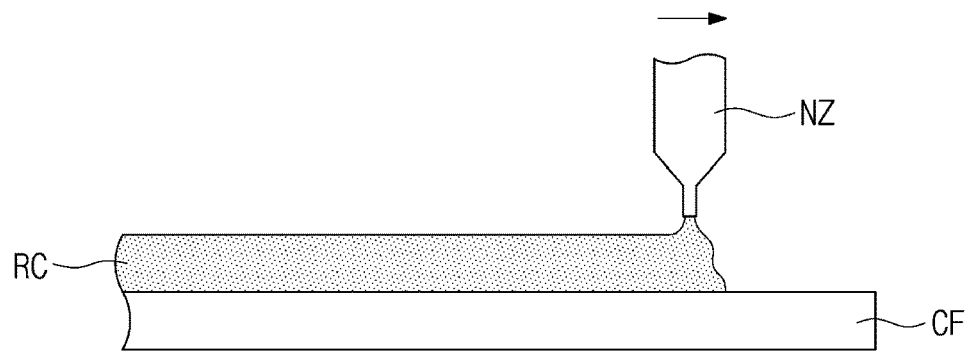
FIG. 5A is a cross-sectional view illustrating a method of manufacturing an adhesive member according to an embodiment of the inventive concept.

FIG. 5A schematically illustrates providing the resin composition (S100). The resin composition RC may be provided on a substrate CF.

For example, the substrate on which the resin composition RC is provided may include polyethylene terephthalate (PET). The substrate CF is a temporary substrate used to form a preliminary adhesive member P-AP from the resin composition RC, which may be used without limitation as long as it may be easily detached from the preliminary adhesive member P-AP after curing the resin composition. For example, release treatment may be conducted on one surface of the substrate CF on which the resin composition RC is provided.

The resin composition RC, according to an embodiment, may have a viscosity of about 5 cP to about 50 cP (exclusive of 50), as measured according to JISK2283 method, at about 25° C. The resin composition RC having a viscosity of about 5 cP to about 50 cP (exclusive of 50), as measured according to the JISK2283 method, at about 25° C. may be provided by an inkjet printing method, a dispensing method, or the like. The resin composition RC having a viscosity of about 5 cP to about 50 cP (exclusive of 50), as measured according to the JISK2283 method, at about 25° C. may be accurately applied when provided. For example, the resin composition RC having a viscosity of about 5 cP to about 50 cP (exclusive of 50), as measured according to the JISK2283 method, at about 25° C. may be provided in a uniform thickness and a uniform amount from a device used for applying the resin composition RC.

FIG. 5A illustrates that the resin composition RC is provided through a nozzle NZ. The resin composition RC having a viscosity of about 5 cP to about 50 cP (exclusive of 50) may be easily discharged from the nozzle NZ and applied in a uniform thickness. The resin composition RC may be provided to form a thin adhesive member AP.

Figure 5B:
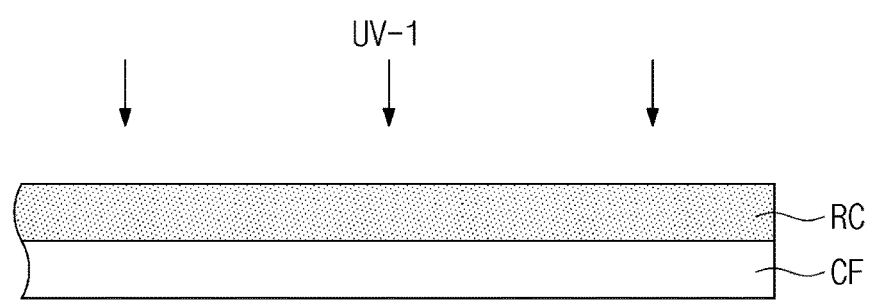
FIG. 5B is a cross-sectional view illustrating a method of manufacturing an adhesive member according to an embodiment of the inventive concept.

The resin composition RC applied in a uniform thickness on the substrate CF may be irradiated with first light UV-1 to form the preliminary adhesive member P-AP. The first light UV-1 may be ultraviolet light. FIG. 5B illustrates that the resin composition RC applied on the substrate CF is directly irradiated with the first light UV-1 to form the preliminary adhesive member P-AP, but the embodiment of the inventive concept is not necessarily limited thereto. A carrier film may be disposed on the resin composition RC applied in a uniform thickness and may transmit ultraviolet light.

Figure 5C:
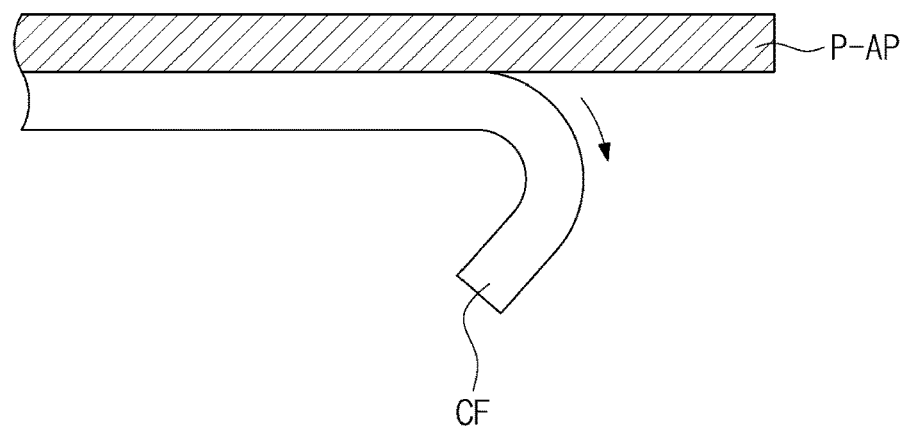
FIG. 5C is a cross-sectional view illustrating a method of manufacturing an adhesive member according to an embodiment of the inventive concept.
Figure 5D:
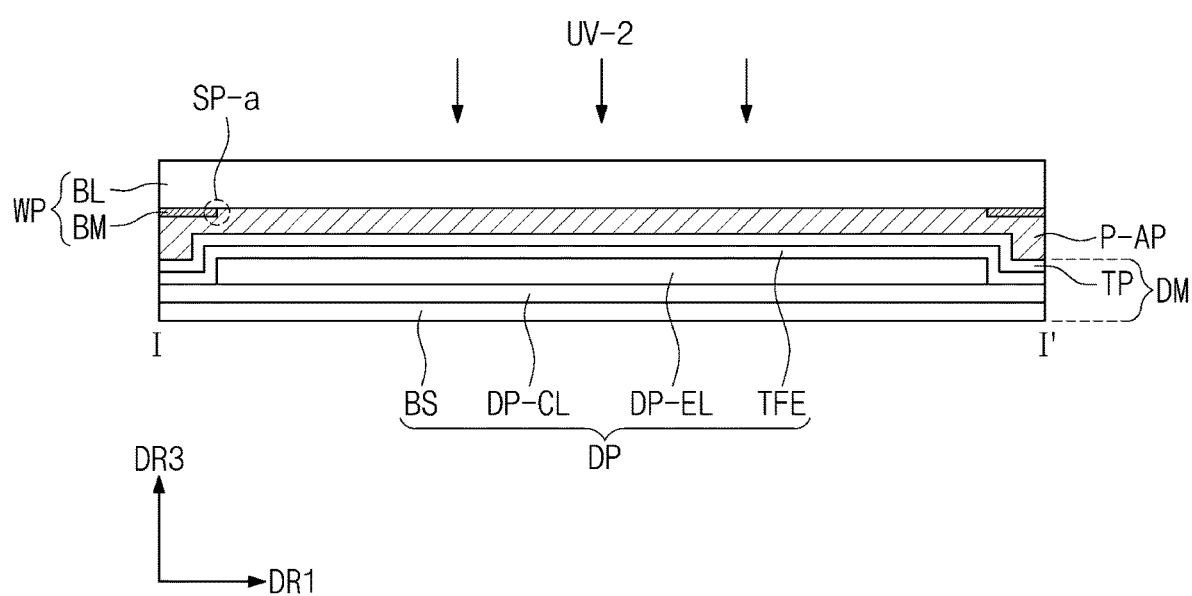
FIG. 5D is a cross-sectional view illustrating a method of manufacturing an adhesive member according to an embodiment of the inventive concept.

Referring to FIGS. 5C and 5D, the preliminary adhesive member P-AP formed by irradiating the resin composition RC with the first light UV-1 may be detached from the substrate CF and provided on one surface of a protective member WP or on one surface of a display module DM. One surface of the preliminary adhesive member P-AP may be laminated on one surface of the protective member WP or on one surface of the display module DM, and one surface of the protective member WP or one surface of the display module DM, which is not attached, may be attached to the other surface of the preliminary adhesive member P-AP. The preliminary adhesive member P-AP disposed between the display module DM and the protective member WP may be irradiated with second light UV-2 to form the final adhesive member AP (see FIG. 3). The second light UV-2 may be provided from above the protective member WP, and the protective member WP may transmit the second light UV-2. An upper portion and lower portion of the protective member WP may be spaced apart along the third directional axis DR3, and the lower portion of the protective member WP may be adjacent to the preliminary adhesive member P-PA. The second light UV-2 may pass through the protective member WP so that the preliminary adhesive member P-AP may be irradiated with the second light UV-2.

The second light UV-2 may be ultraviolet light. A light integral (i.e., dose) of the second light UV-2 may be more than that of the first light UV-1. For example, the light integral of the light UV-2 provided to the preliminary adhesive member P-AP may be more than that of the light UV-2 provided to the resin composition RC. The light integral of the first light UV-1 may be about 200 mJ/cm² to about 1,000 mJ/cm². The light integral of the second light UV-2 may be about 3,500 mJ/cm² to about 4,500 mJ/cm². For example, the light integral of the second light UV-2 may be about 4,000 mJ/cm².

The preliminary adhesive member P-AP formed by irradiating the resin composition RC with the first light UV-1 may have a curing rate of about 80% to about 98% (exclusive of 80 and 98). In an embodiment, when the preliminary adhesive member P-AP having a curing rate of about 80% to about 98% (exclusive of 80 and 98) is attached to an adherend (for example, the display module and/or protective member), the incorporation of air bubbles may be suppressed, thereby stably maintaining the shape of the preliminary adhesive member P-AP. When the preliminary adhesive member P-AP having a curing rate of less than about 80% is attached to the adherend, the adaptability to the adherend may be reduced, and thus air bubbles may be incorporated or the attachment might not be performed stably. Accordingly, the adhesive member formed from the preliminary adhesive member having a curing rate of less than about 80% may have low adhesive reliability.

The curing rate of the preliminary adhesive member P-AP may be calculated on the basis of the amount of the (meth)acryloyl group present determined before and after providing the first light UV-1. The resin composition RC may be cured by the first light UV-1 so that the (meth)acrylate monomer containing the (meth)acryloyl group and the urethane (meth)acrylate oligomer may be cross-linked. When the (meth)acrylate monomer and the urethane (meth)acrylate oligomer is cross-linked, the amount of the (meth)acryloyl group present may be reduced.

For example, the curing rate of the preliminary adhesive member P-AP may satisfy Equation 1 below. Equation 1 may be an equation relating to an absorption amount of the (meth)acryloyl group measured by Fourier-transform infrared spectroscopy (FT-IR) before and after providing the first light UV-1. The absorption amount of the (meth)acryloyl group may be obtained by measuring a height of an absorption peak of about 800 cm⁻¹ to about 820 cm⁻¹.

$$Z_1 = [(X_1 - Y_1)/X_1] \times 100\% \quad \text{[Equation 1]}$$

In Equation 1, $X_1$ may be an absorption amount of the (meth)acryloyl group measured in the resin composition RC, $Y_1$ may be an absorption amount of the (meth)acryloyl group measured in the preliminary adhesive member P-AP, and $Z_1$ may be the curing rate of the preliminary adhesive member P-AP. $X_1$ may be the absorption amount of the (meth)acryloyl group measured before providing the first light UV-1, and $Y_1$ may be the absorption amount of the (meth)acryloyl group measured after providing the first light UV-1. According to Equation 1, when the (meth)acryloyl group is not present in the preliminary adhesive member formed after providing the first light, the curing rate may be about 100%. According to Equation 1, when the (meth)acryloyl group remains as it is in the preliminary adhesive member formed after providing the first light, the curing rate may be about 0%.

In an embodiment, the preliminary adhesive member P-AP may have a loss tangent (tan δ) of about 0.2 to about 0.6 (exclusive of 0.6). The loss tangent (tan δ) is the ratio of a loss modulus to a storage modulus. When the preliminary adhesive member P-AP having a loss tangent (tan δ) of about 0.2 to about 0.6 (exclusive of 0.6) is attached to the adherend, the attachment may be conducted without delamination, and the shape of the preliminary adhesive member P-AP may be stably maintained. Referring to FIG. 5D, when the preliminary adhesive member P-AP and the protective member WP are attached, the attachment may be conducted in an uneven portion SP-a without delamination.

When the preliminary adhesive member P-AP having a loss tangent (tan δ) of less than about 0.2 is attached to the adherend, air bubbles, etc. may occur due to delamination. When the preliminary adhesive member P-AP having a loss tangent (tan δ) of about 0.6 or more is attached to the adherend, thickness, etc. may vary.

In the forming of the preliminary adhesive member P-AP, the first light UV-1 may be provided by at least two processes. For example, the first light UV-1 may be provided by two processes, and the light integral of the first light UV-1 provided in the two processes may be about 1,000 mJ/cm² or less. In addition, the curing rate of the preliminary adhesive member P-AP formed by two processes may be about 80% to about 98% (exclusive of 80 and 98), and the loss tangent (tan δ) may be about 0.2 to about 0.6 (exclusive of 0.6). However, the embodiment of the inventive concept is not necessarily limited thereto, the first light UV-1, which is provided in order to form the preliminary adhesive member P-AP, may be provided by at least three processes.

The adhesive member AP (see FIG. 3) formed by irradiating the preliminary adhesive member P-AP with the second light UV-2 may have a curing rate of greater than about 90%. The adhesive member AP (see FIG. 3) having a curing rate of greater than about 90% may exhibit characteristics in which adhesive reliability and folding reliability are excellent.

The curing rate of the adhesive member AP may satisfy Equation 2 below. Equation 2 may be an equation relating to an absorption amount of the (meth)acryloyl group measured by FT-IR before and after providing the second light UV-2. The absorption amount of the (meth)acryloyl group may be obtained by measuring a height of an absorption peak of about 800 cm⁻¹ to about 820 cm⁻¹.

$$Z_2 = [(X_2 - Y_2)/X_2] \times 100\% \quad \text{[Equation 2]}$$

In Equation 2, $X_2$ may be an absorption amount of the (meth)acryloyl group measured in the preliminary adhesive member P-AP, $Y_2$ may be an absorption amount of the (meth)acryloyl group measured in the adhesive member AP, and $Z_2$ may be the curing rate of the adhesive member AP. $X_2$ may be the absorption amount of the (meth)acryloyl group measured before providing the second light UV-2, and $Y_2$ may be the absorption amount of the (meth)acryloyl group measured after providing the second light UV-2. According to Equation 2, when the (meth)acryloyl group is not present in the adhesive member formed after providing the second light, the curing rate may be about 100%. Alternatively, when the (meth)acryloyl group remains as it is in the adhesive member formed after providing the second light, the curing rate may be about 0%.

The method of manufacturing an adhesive member, according to an embodiment, may include providing first light to a resin composition RC to form a preliminary adhesive member P-AP and providing second light for the preliminary adhesive member P-AP to form the adhesive member AP (see FIG. 3). The preliminary adhesive member P-AP may have a curing rate of about 89% to about 90% (exclusive of 89 and 90) and have a loss tangent (tan δ) of about 0.2 to about 0.6 (exclusive of 0.6). Accordingly, when the preliminary adhesive member P-AP is attached to the adherend, the shape of the preliminary adhesive member P-AP may be maintained stably and the attachment may be conducted without delamination. The adhesive member AP (see FIG. 3) formed from the preliminary adhesive member P-AP may have a glass transition temperature of about −70° C. to about −30° C. (exclusive of −30). Accordingly, the adhesive member AP formed by the method of manufacturing an adhesive member of an embodiment may exhibit excellent adhesive reliability characteristics.

Figure 6:
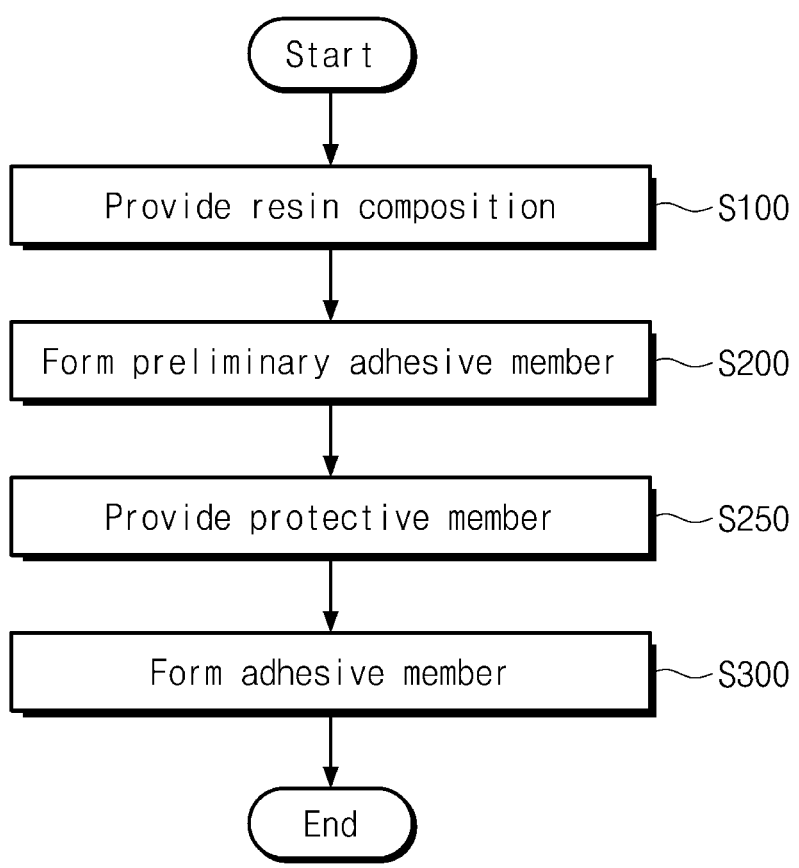
FIG. 6 is a flowchart illustrating a method of manufacturing a display device according to an embodiment of the inventive concept.
Figure 7A:
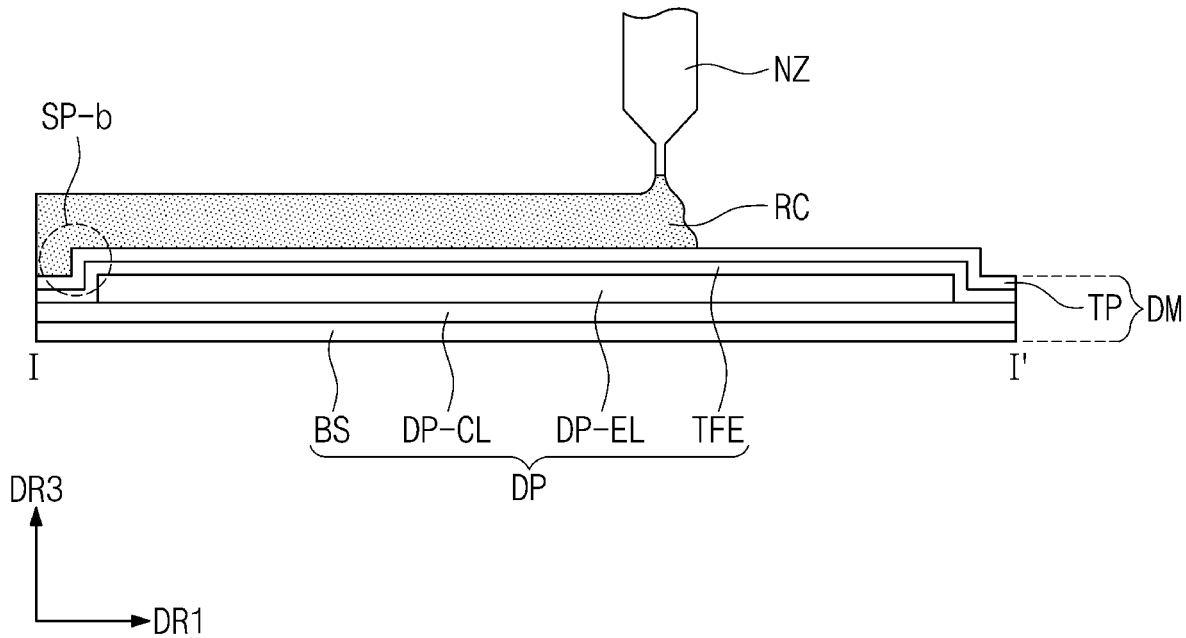
FIG. 7A is a cross-sectional view illustrating a method of manufacturing a display device according to an embodiment of the inventive concept.
Figure 7B:
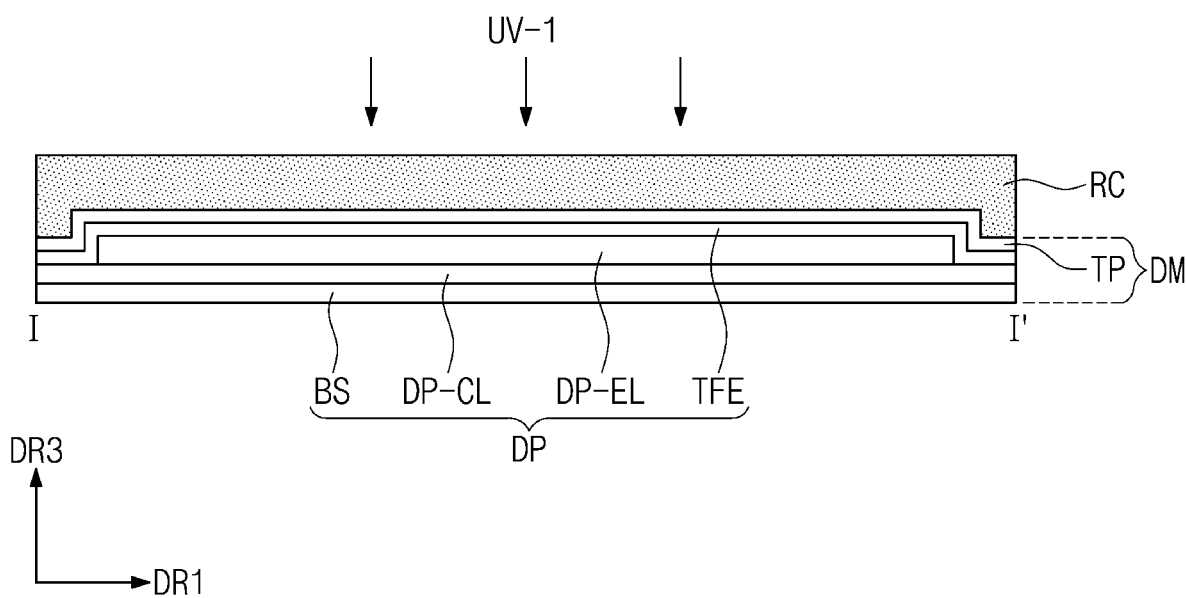
FIG. 7B is a cross-sectional view illustrating a method of manufacturing a display device according to an embodiment of the inventive concept.
Figure 7C:
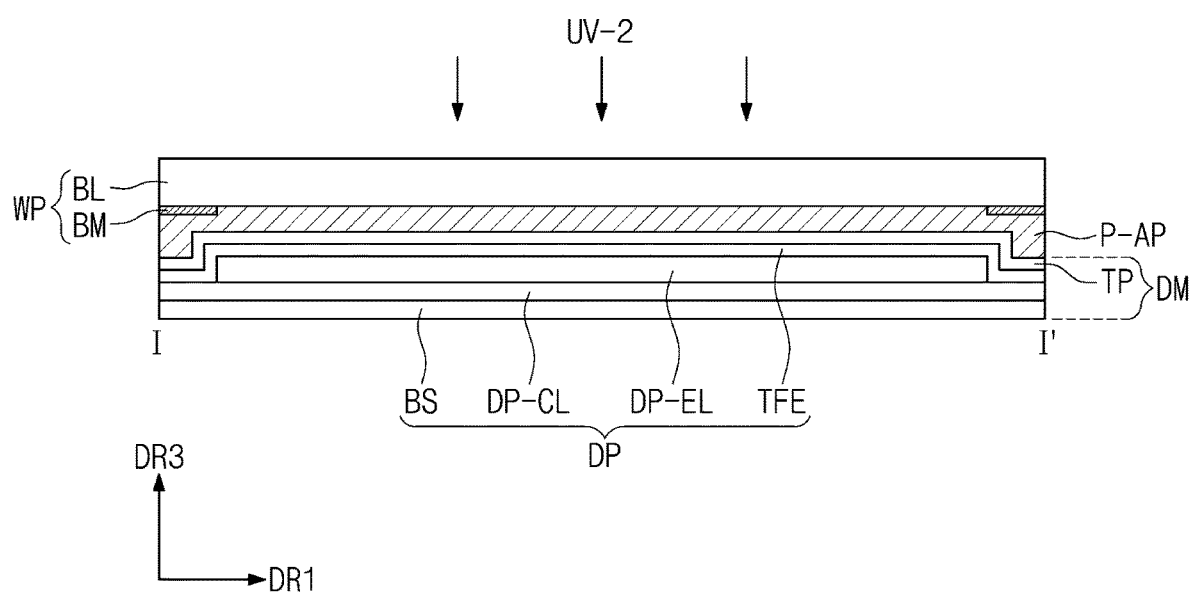
FIG. 7C is a cross-sectional view illustrating a method of manufacturing a display device according to an embodiment of the inventive concept.

The display device DD of an embodiment may be formed by a method of manufacturing a display device of an embodiment. FIG. 6 is a flowchart illustrating the method of manufacturing a display device according to an embodiment. FIGS. 7A to 7C are views schematically illustrating operations of the method of manufacturing a display device according to an embodiment.

Referring to FIG. 6, the method of manufacturing a display device of an embodiment may include providing a resin composition (S100), forming a preliminary adhesive member (S200), providing a protective member (S250), and forming an adhesive member (S300). The method of manufacturing a display device of an embodiment may include the method of manufacturing an adhesive member, and the method of manufacturing an adhesive member may further include the providing of the protective member (S250). Hereinafter, in describing the method of manufacturing a display device of an embodiment with reference to FIGS. 7A to 7C, to the extent that a detailed description of an element is omitted, it may be assumed that the element is at least similar to a corresponding element that has been described with respect to FIGS. 1 to 5D.

FIG. 7A illustrates providing a resin composition RC on a substrate, and the substrate in FIG. 7A may be one surface of a display module DM. The resin composition RC may be provided directly on one surface of the display module DM. However, this is exemplary, and the resin composition RC may be provided directly on one surface of the protective member WP.

The resin composition RC, according to an embodiment, may have a viscosity of about 5 cP to about 50 cP (exclusive of 50), as measured according to the JISK2283 method, at about 25° C., and may be provided through a nozzle NZ. The resin composition RC having a viscosity of about 5 cP to about 50 cP (exclusive of 50), as measured according to the JISK2283 method, at about 25° C. may be provided while covering the uneven portion of a stepped portion SP-b of the display module DM.

The resin composition RC has a low viscosity value of less than about 50 cP, the resin composition RC may be applied without an empty space in the uneven portion such as the stepped portion SP-b. In addition, the resin composition RC having a viscosity value of about 5 cP or more may be uniformly applied in a preset thickness without flowing out of a part, in which the resin composition RC is to be provided, i.e., the display module DM.

Referring to FIG. 7B, first light UV-1 may be provided to the resin composition RC applied in a uniform thickness. The light integral of the first light UV-1 provided to the resin composition RC may be about 200 mJ/cm$^2$ to about 1,000 mJ/cm$^2$. The preliminary adhesive member P-AP formed by irradiating the resin composition RC with the first light UV-1 may have a curing rate of about 80% to about 90% (exclusive of 80 and 90).

FIG. 7C illustrates that the protective member WP is provided on the upper portion of the preliminary adhesive member P-AP. Second light UV-2 may be provided from above the protective member WP after providing the protective member WP. The protective member WP may transmit the second light UV-2. The light integral of the second light UV-2 provided to the preliminary adhesive member P-AP may be about 3,500 mJ/cm$^2$ to about 4,500 mJ/cm$^2$. The adhesive member AP formed from the preliminary adhesive member P-AP may have a curing rate of greater than about 90%.

The method of manufacturing a display device of an embodiment may include the providing of the protective member WP between the forming of the preliminary adhesive member P-AP and the forming of the adhesive member AP, and the protective member WP may transmit the second light UV-2. The second light UV-2 may be provided to form the adhesive member AP by curing the preliminary adhesive member P-AP. The preliminary adhesive member P-AP may have a curing rate of about 80% to about 98% (exclusive of 80 and 98), and the loss tangent (tan δ) may be about 0.2 to about 0.6 (exclusive of 0.6). Accordingly, the method of manufacturing a display device of an embodiment and the display device DD manufactured by the method of manufacturing a display device may exhibit excellent reliability.

Figure 8:
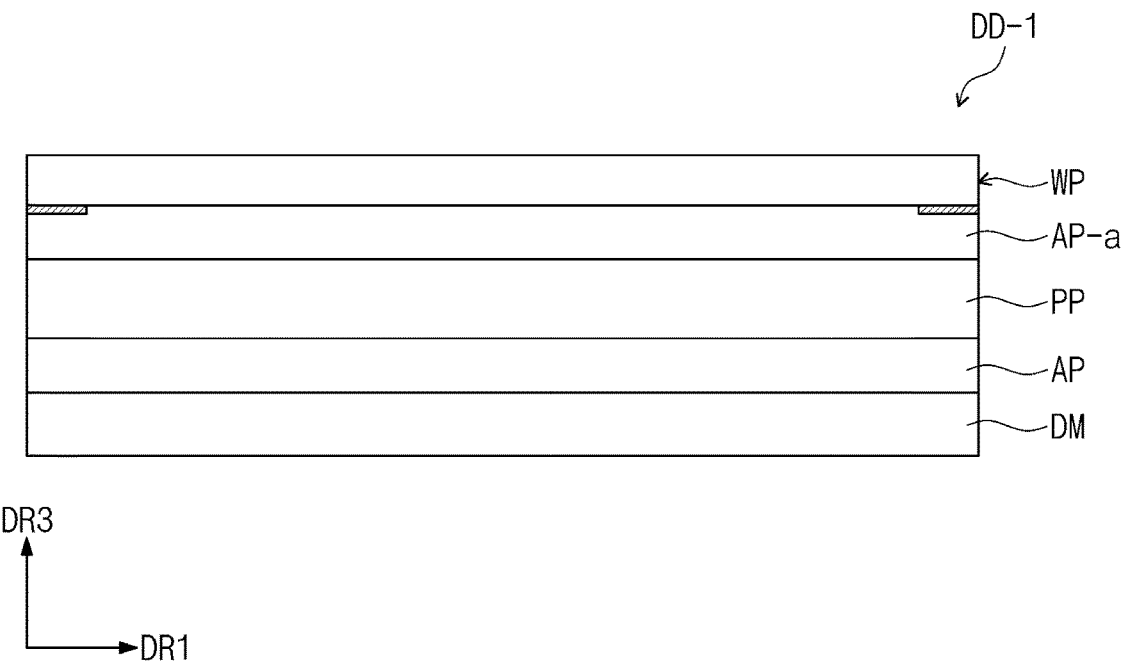
FIG. 8 is a cross-sectional view of a display device of an embodiment of the inventive concept.

FIG. 8 is a cross-sectional view illustrating a display device according to an embodiment. Hereinafter, in describing the display device illustrated in FIG. 8, to the extent that a detailed description of an element is omitted, it may be assumed that the element is at least similar to a corresponding element that has been described with reference to FIGS. 1 to 7C.

The display device DD-1 illustrated in FIG. 8 may further include a light control layer PP and an optical adhesive layer AP-a as compared with the display device DD described with reference to FIGS. 2 and 3. The display device DD-1 of an embodiment may further include the light control layer PP disposed between an adhesive member AP and a protective member WP, and the optical adhesive layer AP-a disposed between the light control layer PP and the protective member WP.

The light control layer PP may be disposed on a display panel DP to control reflected light in the display panel DP due to external light. The light control layer PP may include, for example, a polarization plate or a color filter layer.

The optical adhesive layer AP-a may be an optically clear adhesive film (OCA) or an optically clear adhesive resin layer (OCR). The optical adhesive layer AP-a may be formed from a resin composition RC according to an embodiment like the adhesive member AP (see FIG. 3) of an embodiment as described above. For example, the optical adhesive layer AP-a may include a polymer derived from the resin composition RC having a viscosity of about 5 cP to about 50 cP (exclusive of 50), as measured according to the JISK2283 method, at about 25° C.

The optical adhesive layer AP-a formed from the resin composition RC, according to an embodiment, may have a 180 degree peel strength of about 800 gf/25 mm or more. The optical adhesive layer AP-a formed from the resin composition RC, according to an embodiment, may have a glass transition temperature of about −70° C. to about −30° C. (exclusive of −30). Thus, the display device DD-1 including the optical adhesive layer AP-a and the adhesive member AP may exhibit characteristics in which the adhesive reliability and folding reliability are increased.

Figure 9:
FIG. 9 is a cross-sectional view of a display device of an embodiment of the inventive concept.

FIG. 9 is a cross-sectional view illustrating a display device according to an embodiment. Hereinafter, in describing the display device of an embodiment illustrated in FIG. 9, to the extent that a detailed description of an element is omitted, it may be assumed that the element is at least similar to a corresponding element that has been described with reference to FIGS. 1A to 8.

The display device DD-2 of an embodiment illustrated in FIG. 9 may further include a light control layer PP, an optical adhesive layer AP-a, and an interlayer adhesive layer PIB as compared with the display device DD described with reference to FIGS. 2 and 3. The display device DD-2 of an embodiment may further include the light control layer PP disposed between an adhesive member AP and a protective member WP, and the optical adhesive layer AP-a disposed between the light control layer PP and the protective layer WP like the display device DD-1 of an embodiment illustrated in FIG. 8.

For the display device DD-2 of an embodiment, the adhesive member AP may be provided between a display panel DP and an input sensing unit TP. For example, the input sensing unit TP might not be disposed directly on the display panel DP, and the display panel DP and the input sensing unit TP may be coupled to each other via the adhesive member AP. For example, the adhesive member AP and may be disposed between the encapsulation layer TFE (see FIG. 3) of the display panel DP and the input sensing unit TP.

The interlayer adhesive layer PIB may be provided to the bottom side of the light control layer PP. The interlayer adhesive layer PIB may be disposed between the input sensing unit TP and the light control layer PP and may be formed of an adhesive material having superior anti-moisture permeability. For example, the interlayer adhesive layer PIB may include polyisobutylene. The interlayer adhesive layer PIB may be disposed on the input sensing unit TP to prevent corrosion of sensing electrodes of the input sensing unit TP. The display device DD-2 of an embodiment may include the optical adhesive layer AP-a and the adhesive member AP formed from the resin composition RC according to an embodiment, and the display device DD-2 including the optical adhesive layer AP-a and the adhesive member AP may exhibit characteristics in which the adhesive reliability and folding reliability are excellent.

Hereinafter, with reference to Examples and Comparative Examples, an adhesive member and a display device formed from a resin composition according to an embodiment of the inventive concept will be described in detail. In addition, Examples described below are illustrations to assist the understanding of the inventive concept, and the scope of the inventive concept is not necessarily limited thereto.

Examples

1. Preparation of Resin Composition

Resin compositions of Examples and Comparative Examples were prepared with the compound ratio listed in Tables 1 to 3. Materials listed in Tables 1 to 3 were provided to a heat-resistant light-shielding container in a weight ratio of each material. In addition, Omnirad TPO-H (IGM Resin, Inc.), Esacure 3644 (IGM Resin, Inc.), Photomer 4250 (IGM Resin, Inc.), and Omnirad 819 (IGM Resin, Inc.) as photoinitiators were mixed in a weight ratio of about 60:10:1:30 and provided in an amount of 2 wt % with respect to a total weight of the resin composition. Then, to uniformly mix the composition, a rotation revolution stirring deaerator (made by SHASHIN KAGAKU CO., Ltd.) was used and the composition was stirred at about 1,000 rpm for about 30 minutes to prepare the resin compositions of Examples and Comparative Examples.

<Data About Photopolymerization Initiators>

Omnirad TPO-H: (2,4,6-trimethylbenzoyl)-diphenylphosphine oxide (self-cleavage type radical polymerization initiator, IGM Resins, Inc.)

Esacure 3644: ketocumarine (hydrogen drawing type radical polymerization initiator, IGM Resins, Inc.)

Photomer 4250: hexahydro-1H-azepinacid-2,2-bis[[(1-oxo-2-prophenyl)-oxy]methyl]butyl (curing accelerator agent, IGM Resins, Inc.)

Omnirad 819: phenylbis(2,4,6-trimethylbenzoyl)phosphine oxide (self-cleavage type radical polymerization initiator, IGM Resins, Inc.)

TABLE 1

| Materials | Example 1 | Example 2 | Example 3 | Example 4 | Example 5 |
|---|---|---|---|---|---|
| IDAA | | 35 | 30 | | 30 |
| 2-EHA | 85 | 40 | 40 | 75 | 45 |
| 4-HBA | 9 | 15 | 10 | 10 | 10 |
| Viscoat#260 | | 0.4 | 0.4 | 0.3 | 0.4 |
| UN6304 | 3 | | 10 | | |
| UN6207 | | 5 | 10 | 10 | |
| CN9004 | 3 | 5 | | 5 | 15 |

TABLE 2

| Materials | Comparative Example 1 | Comparative Example 2 | Comparative Example 3 | Comparative Example 4 | Comparative Example 5 | Comparative Example 6 |
|---|---|---|---|---|---|---|
| IDAA | 20 | 40 | 20 | 20 | 30 | 30 |
| 2-EHA | 75 | 30 | 30 | 72 | 25 | 35 |
| 4-HBA | | 20 | 30 | | 35 | 10 |
| Viscoat#260 | 0.2 | 2 | | | 0.3 | 0.2 |
| UN6304 | | | 5 | 10 | 8 | |
| UN6207 | 5 | | | 8 | 2 | 10 |
| CN9004 | | 5 | 10 | | | 15 |

TABLE 3

| Materials | Comparative Example 7 | Comparative Example 8 | Comparative Example 9 | Comparative Example 10 | Comparative Example 11 |
|---|---|---|---|---|---|
| 4-HBA | | | | 20 | 10 |
| Hydroxy ethyl methacrylate | 20 | | | | |
| FA-512M | | 20 | | | |
| HPMA | | 3 | | | |
| Light ester THF | | 15 | | | |
| Light ester L | | 20 | | | |
| LA | | | | 20 | 30 |

TABLE 3-continued

| Materials | Comparative Example 7 | Comparative Example 8 | Comparative Example 9 | Comparative Example 10 | Comparative Example 11 |
|---|---|---|---|---|---|
| A-TMMT | | | | | 3 |
| TE-2000 | 50 | | | | |
| UC-203 | | 40 | | | |
| Polyoil110 | | 20 | | | |
| UN6207 | | | 60 | 40 | |
| UV3630ID80 | | | | | 50 |
| P85 | | 45 | | | |
| PKA-5016 | | | 20 | | |
| PKA-5017 | | | | 40 | |
| KE311 | | | | | 45 |
| ME-D | | | | | 60 |

<Data About Material in Tables 1 to 3>

IDAA: iso-decyl acrylate (made by Osaka Organic Chemical Industry Ltd.), molecular weight of 212

2-EHA: 2-ethylhexyl acrylate (made by TOAGOSEI Co., Ltd.), molecular weight 184

4-HBA: 4-hydroxybutyl acrylate (made by Osaka Organic Chemical Industry Ltd.), molecular weight of 144

Viscoat #260: 1,9-nonanediol diacrylate (made by Osaka Organic Chemical Industry Ltd.), molecular weight of 268

Hydroxy ethyl methacrylate (made by TOKYO CHEMICAL INDUSTRY CO., Ltd. (TCI))

FA-512M: dicyclopentenyl oxyethyl methacrylate (made by Hitachi Chemical Company, Ltd.)

HPMA: hydroxypropyl methacrylate (made by Nihon Kasei CO., Ltd.)

Light ester THF: tetrahydrofurfuryl methacrylate (made by KYOEISHA CHEMICAL Co., Ltd.)

Light ester L: lauryl methacrylate (made by KYOEISHA CHEMICAL Co., Ltd.)

LA: lauryl acrylate (made by KYOEISHA CHEMICAL Co., Ltd.)

A-TMMT: pentaerythritol tetraacrylate (made by SHIN-NAKAMURA CHEMICAL Co., Ltd.)

UN6304: urethane acrylate (made by Negami Chemical Industrial Co., Ltd.), molecular weight of 13,000

UN6207: urethane acrylate (made by Negami Chemical Industrial Co., Ltd.), molecular weight of 27,000

CN9004: urethane acrylate (made by ARKEMA K.K.), molecular weight of 10,000 to 40,000 (exclusive of 40,000) TE-2000: acrylic-based oligomer having polybutadiene skeleton (made by Nippon Soda Co., Ltd.)

UC-203: acrylic-based oligomer having polyisoprene skeleton (made by KURARAY Co., Ltd.)

Polyoil110: polybutadiene polymer (made by Evonik Industries AG)

UV36301D80: polyurethane acrylate (made by The Nippon Synthetic Chemical Industry Co., Ltd.)

P85: hydrogenated terpene resin (made by YASUHARA CHEMICAL Co., Ltd.)

PKA-5016: polyethylene glycol polypropylene glycol allylbutylether, (made by NOF CORPORATION)

PKA-5017: polyethylene glycol polypropylene glycol allylbutylether, (made by NOF CORPORATION)

KE311: hydrogenated rosin ester (made by Arakawa Chemical Industries, Ltd.)

ME-D: liquid hydrogenated rosin ester (made by Arakawa Chemical Industries, Ltd.)

In Tables 1 to 3, IDAA, 2-EHA, 4-HBA, hydroxy ethyl methacrylate, FA-512M, HPMA, Light ester THF, Light ester L, LA, and A-TMMT correspond to a monomer. Viscoat #260 corresponds to a cross-linking agent. UN6304, UN6207, CN9004, TE-2000, UC-203, Polyoil110, and UV3630ID80 correspond to an oligomer.

Comparative Examples 7 and 8 in Table 3 correspond to photocurable resin compositions A and B in Patent Document JP 5370706. Comparative Examples 9 and 10 correspond to Examples 1 and 3 in Table 1 in Patent Document JP 6185122. Comparative Example 11 corresponds to Example 1 in Table 1 in Patent Document JP 6528103. KE311 corresponds to a tackifier, and ME-D corresponds to a liquid plasticizer.

2. Evaluation of Resin Composition and Adhesive Member

For Examples and Comparative Examples, viscosity of the resin composition, inkjet printing provision, curing rate and loss tangent (tang δ) of the preliminary adhesive member, attachment of the preliminary adhesive member and adherend, curing rate of the adhesive member, 180 degree peel strength, glass transition temperature, and folding reliability were evaluated, and the results are listed in Tables 4 to 6 below. The attachment of the preliminary adhesive member and adherend is shown by evaluating whether the reliability of the preliminary adhesive member is maintained or not when the preliminary adhesive member is attached to the adherend. Hereinafter, the evaluation method will be described in more detail.

<Viscosity Measurement of Resin Composition>

The viscosity of the resin composition was measured according to the JISK2283 method at about 25° C. The viscosity of the resin composition was measured at a speed of about 10 rpm using a viscometer TVE-25L (made by TOKI SANGYO Co., Ltd.).

<Inkjet Printing Provision of Resin Composition>

The prepared resin composition was applied on Soda-lime glass (made by Central Glass Co., Ltd.) to be a thickness of about 50 μm by using an inkjet printer (made by MICROJET Co., Ltd.) The applied resin composition was cured by providing ultraviolet light, and after cured, the appearance of the cured product was observed by naked eyes. In Tables 4 to 6, the case where the resin composition was applied in a uniform thickness and a flow did not occur is represented by "⊚" the case where the resin composition was applied in a non-uniform thickness or a flow occurred is represented by "Δ," and the case where the resin composition was not discharged from the inkjet printer is represented by "X."

<Curing Rate Measurement of Preliminary Adhesive Member>

The prepared resin composition was applied on Soda-lime glass (made by Central Glass Co., Ltd.) to be a thickness of about 50 μm by using an inkjet printer (made by MICROJET Co., Ltd.) The resin composition, which was impossible to be applied by the inkjet printer, was adjusted to have a thickness of about 50 μm by using a bar coater.

The applied resin composition was irradiated with ultraviolet light to be a light integral of light of about 220 mJ/cm$^2$ and 380 mJ/cm$^2$ by using a UV-LED lamp having peaks at wavelengths of about 405 nm and about 365 nm, respectively, thereby forming a preliminary adhesive member. The curing rate of the preliminary adhesive member was measured by using FT-IR. The height $X_1$ of the absorption peak of about 800 cm$^{-1}$ to about 820 cm$^{-1}$ in a baseline of an FT-IR measurement graph in the resin composition before providing the ultraviolet light, and the height $Y_1$ of the absorption peak of about 800 cm$^{-1}$ to about 820 cm$^{-1}$ in the baseline of the FT-IR measurement graph in the preliminary adhesive member after providing the ultraviolet light were measured, and the curing rate was calculated by Equation 1.

$Z_1=[(X_1-Y_1)/X_1]\times 100\%$ [Equation 1]

In Equation 1, $Z_1$ is the curing rate.

<Loss Tangent (Tan δ) Measurement of Preliminary Adhesive Member>

On a slide glass (made by Matsunami Glass Ind., Ltd., product name: Slide glass S1112), a PET film (made by PANAC Co., Ltd., product name: NP100A), on which release treatment was conducted, and a silicone rubber sheet (made by TIGERS POLYMER CORPORATION), through which a hole having a diameter of about 8 mm was formed, were sequentially stacked. The resin composition (28 μL) was dropped in the hole of the silicone rubber sheet, and was irradiated with ultraviolet light to be a light integral of light of about 220 mJ/cm$^2$ and about 380 mJ/cm$^2$ by using the UV-LED lamp having peaks at wavelengths of about 405 nm and about 365 nm, respectively, thereby obtaining a preliminary adhesive member (diameter: about 8 mmΦ, thickness: about 0.5 mmt). The loss tangent (tan δ) of the preliminary adhesive member was measured at about 25° C. with a dynamic rheometer (made by Anton Paar Japan K.K, product name: MCR302). The measurement conditions were set as a frequency of 1 Hz, a temperature range of −80° C. to 80° C., and a temperature raising rate of 10° C./minute.

<Attachment of Preliminary Adhesive Member and Adherend>

A preliminary adhesive member was obtained in the same manner as the method of measuring the curing rate of the preliminary adhesive member. On the obtained preliminary adhesive member, a PET film (made by TOYOBO Co., Ltd., product name: A4360, thickness: about 50 μm) was provided, and a pressure of about 0.5 MPa was applied thereto by using an automatic pressure-heating apparatus (made by Chiyoda Electronics Co., Ltd., product name: ACS-230). The pressure was applied thereto for about five minutes at a temperature of about 30° C., and then the appearance of the stacked body was observed. In Tables 4 to 6, "⊚" represents no changes in appearance of the stacked body, and "bubbles" represent the occurrence of the bubbles between the preliminary adhesive member and the PET film. "Leakage" refers to the occurrence of a flow in the preliminary adhesive member, and "changes in thickness" refers to the changes in thickness of the stacked body.

<Curing Rate Measurement of Adhesive Member>

Onto the preliminary adhesive member which was obtained in the same manner as the method of measuring the curing rate of the preliminary adhesive member, a PET film (made by TOYOBO Co., Ltd., product name: A4360, thickness: about 50 μm) was attached, and a pressure of about 0.5 MPa was applied thereto by using the automatic pressure-heating apparatus (made by Chiyoda Electronics Co., Ltd., product name: ACS-230). The pressure was applied thereto for about five minutes at a temperature of about 30° C., and then the resulting product was irradiated with the ultraviolet light to be a light integral of light of about 4,000 mJ/cm$^2$ by using a UV-LED lamp having a peak at a wavelength of about 395 nm to thus obtain a stacked body.

The curing rate of the adhesive member in the obtained stacked body was measured by using FT-IR, and the measurement was conducted in the same manner as the method of measuring the curing rate of the preliminary adhesive member. The height $X_2$ of the absorption peak of about 800 cm$^{-1}$ to about 820 cm$^{-1}$ in a baseline of an FT-IR measurement graph in the preliminary adhesive before providing the ultraviolet light, and the height $Y_2$ of the absorption peak of about 800 cm$^{-1}$ to about 820 cm$^{-1}$ in the baseline of the FT-IR measurement graph in the adhesive member after providing the ultraviolet light were measured, and the curing rate was calculated by Equation 2.

$Z_2=[(X_2-Y_2)/X_2]\times 100\%$ [Equation 2]

In Equation 2, $Z_2$ is the curing rate.

<180 Degree Peel Strength Measurement of Adhesive Member>

The prepared resin composition was applied on Soda-lime glass (made by Central Glass Co., Ltd.) to be a thickness of about 50 μm. Then, the resin composition was irradiated with the ultraviolet light to be a light integral of light of about 220 mJ/cm$^2$ and 380 mJ/cm$^2$ by using a UV-LED lamp having peaks at wavelengths of about 405 nm and about 365 nm, respectively, thereby forming a preliminary adhesive member. On the formed preliminary adhesive member, a PET film (made by TOYOBO Co., Ltd., product name: A4360, thickness: about 50 μm) was provided, and an attachment process was performed for about five minutes under the conditions of about 30° C. and about 0.5 MPa by using the automatic pressure-heating apparatus (made by Chiyoda Electronics Co., Ltd., product name: ACS-230).

Then, the attached product was irradiated with the ultraviolet light to be a light integral of light of about 4,000 mJ/cm$^2$ by using the UV-LED lamp having a peak at a wavelength of about 395 nm to thus obtain a stacked body. Using the stacked body, the 180 degree peel strength was measured with a tensile test machine (made by INSTRON Co., product name: INSTRON 5965 system). The measurement conditions were set as a temperature of 25° C. and a tensile rate of 300 mm/minute.

<Glass Transition Temperature Measurement of Adhesive Member>

A preliminary adhesive member (diameter: about 8 mmΦ, thickness: about 0.5 mmt) was obtained in the same manner as the method of measuring the loss tangent of the preliminary adhesive member. On the preliminary adhesive member, a PET film (made by PANAC Co., Ltd., product name: NP100A), on which release treatment was conducted, and a slide glass (made by Matsunami Glass Ind., Ltd., product name: Slide glass S1112) were sequentially stacked.

The side of the stacked slide glass was irradiated with the ultraviolet light to be a light integral of light of about 4,000 mJ/cm$^2$ by using the UV-LED lamp having a peak at about 395 nm to obtain an adhesive member sample (diameter:

about 8 mm, thickness: about 500 μm). The glass transition temperature of the obtained adhesive member sample (diameter: about 8 mm, thickness: about 500 μm) was measured by using the dynamic rheometer (made by Anton Paar Japan K.K, product name: MCR302). The measurement conditions were set as a frequency of 1 Hz, a temperature range of −80° C. to 80° C., and a temperature raising rate of 10° C./minute.

<Folding Reliability Evaluation of Adhesive Member>

On a PET film having a thickness of about 50 μm, each resin composition of Comparative Examples and Examples was applied to be a thickness of about 50 μm. The resin composition was irradiated with the ultraviolet light to be a light integral of light of about 220 mJ/cm² and 380 mJ/cm² by using the UV-LED lamp having peaks at wavelengths of about 405 nm and about 365 nm, respectively, thereby forming a preliminary adhesive member. On the preliminary adhesive member, a PET film (made by TOYOBO Co., Ltd., product name: A4360, thickness: about 50 μm) was provided, and an attachment process was performed for about five minutes under the conditions of about 30° C. and about 0.5 MPa by using the automatic pressure-heating apparatus (made by Chiyoda Electronics Co., Ltd., product name: ACS-230). Then, the attached product was irradiated with the ultraviolet light to a light integral of light of about 4,000 mJ/cm² by using the UV-LED lamp having a peak at a wavelength of about 395 nm to thus obtain a stacked body.

By using a tension-free U-shape folding tester (made by YUASA SYSTEM Co., Ltd.), a bent jig was installed on the short side of the obtained stacked body, and folding was repeated in a 25° C. thermostat. Under the conditions of a bending angle of 180°, a bending radius of 3 mm, a bending speed of 1 second per 1 time, 200 thousand foldings were repeated and then the appearance of the stacked body was observed. In Tables 4 to 6, "↑" refers to no changes in appearance of the stacked body, "peel" refers to the peeling off of the PET film from the adhesive member, and "broken" refers to the occurrence of the breakage of the adhesive member.

Referring to Table 4, it may be seen that the resin compositions of Examples 1 to 5 exhibit viscosities of about 5 cP to about 50 cP (exclusive of 50) at about 25° C. and are possible to be applied in a uniform thickness without the occurrence of a flow when provided by the inkjet printing. It may be seen that the curing rates of the preliminary adhesive members formed from the resin compositions of Examples 1 to 5 are about 80% to about 98% (exclusive of 80 and 98), and the loss tangents (tan δ) are about 0.2 to about 0.6 (exclusive of 0.6). Accordingly, it may be seen that the preliminary adhesive members formed from the resin compositions of Examples 1 to 5 exhibit excellent reliability when attached to the adherends.

It may be seen that the adhesive members formed from the resin compositions of Examples 1 to 5 exhibit a curing rate of greater than about 90% and have a 180 degree peel strength of about 800 gf/25 mm or more. In addition, it may be seen that the adhesive members formed from the resin compositions of Examples 1 to 5 have a glass transition temperature of about −70° C. to about −30° C. (exclusive of −30). Accordingly, it may be seen that the adhesive members formed from the resin compositions of Examples 1 to 5 exhibit the characteristics in which the adhesive reliability and folding reliability are excellent.

The resin compositions of Examples 1 to 5 are resin compositions according to examples, and the preliminary adhesive members formed from the resin compositions according to examples may exhibit excellent reliability characteristics when attached to the adherends. In addition, the adhesive members formed from the preliminary adhesive members according to examples may exhibit excellent adhesive reliability and folding reliability. Therefore, the display devices including the adhesive members according to examples may exhibit the characteristics in which the reliability is increased.

TABLE 4

| Division | Example 1 | Example 2 | Example 3 | Example 4 | Example 5 |
| --- | --- | --- | --- | --- | --- |
| Viscosity (cP) | 5 | 18 | 41 | 28 | 48 |
| Inkjet printing provision | ◎ | ◎ | ◎ | ◎ | ◎ |
| Curing rate (%) of preliminary adhesive member | 81 | 84 | 92 | 89 | 97 |
| Loss tangent (tan δ) of preliminary adhesive member | 0.58 | 0.46 | 0.40 | 0.53 | 0.21 |
| Attachment of preliminary adhesive member and adherend | ◎ | ◎ | ◎ | ◎ | ◎ |
| Curing rate (%) of adhesive member | 91 | 96 | 98 | 98 | 99 |
| 180 degree peel strength (gf/25 mm) of adhesive member | 820 | 1930 | 1560 | 1030 | 1290 |
| Glass transition temperature (° C.) of adhesive member | −69 | −32 | −55 | −41 | −38 |
| Folding reliability | ◎ | ◎ | ◎ | ◎ | ◎ |

TABLE 5

| Division | Comparative Example 1 | Comparative Example 2 | Comparative Example 3 | Comparative Example 4 | Comparative Example 5 | Comparative Example 6 |
|---|---|---|---|---|---|---|
| Viscosity (cP) | 7 | 34 | 47 | 19 | 29 | 89 |
| Inkjet printing provision | ⊚ | ⊚ | ⊚ | ⊚ | ⊚ | X |
| Curing rate (%) of preliminary adhesive member | 76 | 95 | 98 | 82 | 95 | 97 |
| Loss tangent (tan δ) of preliminary adhesive member | 0.57 | 0.18 | 0.34 | 0.68 | 0.27 | 0.24 |
| Attachment of preliminary adhesive member and adherend | Leakage, changes in thickness | Bubbles | ⊚ | Changes in thickness | ⊚ | ⊚ |
| Curing rate (%) of adhesive member | 92 | 98 | 99 | 96 | 98 | 99 |
| 180 degree peel strength (gf/25 mm) of adhesive member | 620 | 770 | 210 | 830 | 1910 | 1390 |
| Glass transition temperature (° C.) of adhesive member | −67 | −59 | −37 | −65 | −19 | −38 |
| Folding reliability | Peel | Peel | Peel | ⊚ | Broken | ⊚ |

Referring to Table 5, it may be seen that the preliminary adhesive member formed from the resin composition of Comparative Example 1 exhibits a curing rate of about 80% or less, and when the preliminary adhesive member is attached to the adherend, a flow occurs and the thickness varies. It may be seen that the adhesive member formed from the resin composition of Comparative Example 1 exhibits a 180 degree peel strength of less than about 800 gf/25 mm at about 25° C. and is peeled off upon repeated folding and unfolding.

It may be seen that the preliminary adhesive member formed from the resin composition of Comparative Example 2 exhibits a loss tangent (tan δ) of less than about 0.2, and bubbles occur when the preliminary adhesive member is attached to the adherend. It may be seen that the adhesive member formed from the resin composition of Comparative Example 2 exhibits a 180 degree peel strength of less than about 800 gf/25 mm at about 25° C., and the peel occurs upon repeated folding and unfolding.

It may be seen that the preliminary adhesive member formed from the resin composition of Comparative Example 3 exhibits a curing rate of about 98% or more, and the adhesive member formed from the resin composition of Comparative Example 3 exhibits a 180 degree peel strength of less than about 800 gf/25 mm at about 25° C. Thus, it is believed that when the preliminary adhesive member is attached to the adherend, adhesion is deteriorated, and the adhesive member formed from the preliminary adhesive member is peeled off upon repeated folding and unfolding.

The resin composition of Comparative Example 4 includes one urethane (meth)acrylate oligomer, and the one urethane (meth)acrylate oligomer is included in an amount of less than about 10 wt % with respect to the total weight of the resin composition. It may be seen that the preliminary adhesive member formed from the resin composition of Comparative Example 4 exhibits a loss tangent (tan δ) of about 0.6 or more, and the thickness varies when the preliminary adhesive member is attached to the adherend.

It may be seen that the adhesive member formed from the resin composition of Comparative Example 5 exhibits a glass transition temperature of about −30° C. or higher. Accordingly, it is believed that the adhesive member formed from the resin composition of Comparative Example 5 is peeled off upon repeated folding and unfolding.

It may be seen that the resin composition of Comparative Example 6 has a viscosity of about 50 cP or more at about 25° C. Accordingly, it may be seen that the resin composition of Comparative Example 6 is not discharged from the device when provided in the inkjet printing method.

TABLE 6

| Division | Comparative Example 7 | Comparative Example 8 | Comparative Example 9 | Comparative Example 10 | Comparative Example 11 |
|---|---|---|---|---|---|
| Viscosity [cP] | 3800 | 5200 | 12200 | 8100 | 15200 |
| Inkjet printing provision | X | X | X | X | X |

TABLE 6-continued

| Division | Comparative Example 7 | Comparative Example 8 | Comparative Example 9 | Comparative Example 10 | Comparative Example 11 |
|---|---|---|---|---|---|
| Curing rate [%] of preliminary adhesive member | 76 | 49 | 59 | 62 | 92 |
| Loss tangent (tan δ) of preliminary adhesive member | 0.32 | 0.29 | 0.34 | 0.41 | 0.18 |
| Attachment of preliminary adhesive member and adherend | Leakage, changes in thickness | Leakage, changes in thickness | Leakage, changes in thickness | Leakage, changes in thickness | Bubbles |
| Curing rate (%) of adhesive member | 93 | 91 | 91 | 92 | 99 |
| 180 degree peel strength (gf/25 mm) of adhesive member | 930 | 1020 | 620 | 440 | 670 |
| Glass transition temperature (° C.) of adhesive member | 13 | −6 | −43 | −49 | 56 |
| Folding reliability | Broken | Broken | Peel | Peel | Broken |

Referring to Table 6, it may be seen that the resin compositions of Comparative Examples 7 to 11 exhibit high viscosities of about 3,000 cP or more. Accordingly, it may be seen that the resin compositions of Comparative Examples 7 to 11 are not discharged from the device when provided in the inkjet printing method.

As described above, it is believed that the resin compositions of Comparative Examples 7 and 8 correspond to Patent Document JP 5370706 and include a high content of oligomers, thereby exhibiting a high viscosity. It may be seen that the preliminary adhesive members formed from the resin compositions of Comparative Examples 7 and 8 exhibit a curing rate of about 80% or less, and when the preliminary adhesive members are attached to the adherends, a flow occurs and the thickness varies. It is believed that the adhesive members formed from the resin compositions of Comparative Examples 7 and 8 exhibit a glass transition temperature of about −30° C. or higher and are thus peeled off upon repeated folding and unfolding.

As described above, it is believed that the resin compositions of Comparative Examples 9 and 10 correspond to Patent Document JP 6185122 and include a high content of oligomers and polyethylene glycol compounds, thereby exhibiting a high viscosity. It may be seen that the preliminary adhesive members formed from the resin compositions of Comparative Examples 9 and 10 exhibit a curing rate of about 80% or less, and when the preliminary adhesive members are attached to the adherends, a flow occurs and the thickness varies. In addition, it may be seen that the adhesive members formed from the resin compositions of Comparative Examples 9 and 10 exhibit a 180 degree peel strength of less than about 800 gf/25 mm at about 25° C. and are peeled off upon repeated folding and unfolding.

It is believed that the resin composition of Comparative Example 11 corresponds to Patent Document JP 6528103 and includes KE11 corresponding to a tackifier and ME-D corresponding to a liquid plasticizer, thereby exhibiting a high viscosity. In addition, Patent Document JP 6528103 includes only one curing process of a resin composition. It may be seen that the preliminary adhesive member formed from the resin composition of Comparative Example 11 exhibits a loss tangent (tan δ) of less than about 0.2, and bubbles occur when the preliminary adhesive member is attached to the adherend. It may be seen that the adhesive member formed from the resin composition of Comparative Example 11 exhibits a 180 degree peel strength of less than about 800 gf/25 mm at about 25° C., and have a glass transition temperature of about 56° C. Accordingly, it is believed that the adhesive member formed from the resin composition of Comparative Example 11 is broken upon repeated folding and unfolding.

The method of manufacturing an adhesive member of an embodiment may include providing a resin composition having a viscosity of about 5 cP to about 50 cP (exclusive of 50) at about 25° C. as measured according to JISK2283 method, providing first light to the resin composition to form a preliminary adhesive member, and providing second light to the preliminary adhesive member to form an adhesive member. The preliminary adhesive member may have a curing rate of about 80% to about 98% (exclusive of 80 and 98) and have a loss tangent (tan δ) of about 0.2 to about 0.6 (exclusive of 0.6). Accordingly, when the preliminary adhesive member is attached to the adherend, the excellent reliability may be exhibited.

The method of manufacturing a display device of an embodiment may include the method of manufacturing an adhesive member of an embodiment and providing a protective member on the preliminary adhesive member. The protective member transmits the second light, and the second light passing through the protective member may be provided to the preliminary adhesive member.

The display device of an embodiment formed by the method of manufacturing a display device of an embodiment may include an adhesive member between the display panel and the protective member. The adhesive member may have a 180 degree peel strength of 800 gf/25 mm with respect to the polymer substrate and have a glass transition temperature of about −70° C. to about −30° C. (exclusive of −30). Accordingly, the display device including the adhesive member according to an embodiment may exhibit the characteristics in which the adhesive reliability and folding reliability are excellent.

The method of manufacturing an adhesive member of an embodiment and a method of manufacturing a display device including the same may provide a preliminary adhesive member that satisfies a preset range of a curing rate and loss tangent and may have an increase in reliability.

The display device of an embodiment may include an adhesive member formed by the method of manufacturing a display device, thereby exhibiting characteristics in which adhesive reliability and folding reliability are excellent.

Although the inventive concept has been described with reference to a embodiment of the inventive concept, it will be understood that the inventive concept is not necessarily limited to these embodiments but various changes and modifications can be made by those skilled in the art without departing from the spirit and scope of the present disclosure.

What is claimed is:

1. A method of manufacturing an adhesive member, comprising:
    providing, on a substrate, a resin composition having a viscosity of about 5 cP to about 50 cP (exclusive of 50), as measured according to a JISK2283 method, at about 25° C.;
    exposing the resin composition to a first light to form a preliminary adhesive member having a curing rate of about 80% to about 98% (exclusive of 80 and 98); and
    exposing the preliminary adhesive member to a second light having a light integral that is greater than a light integral of the first light to form an adhesive member,
    wherein the preliminary adhesive member has a loss tangent (tan δ) of about 0.2 to about 0.6 (exclusive of 0.6), and the adhesive member has a glass transition temperature of about −70° C. to about −30° C. (exclusive of −30).

2. The method of claim 1, wherein the resin composition is provided by an inkjet printing method or a dispensing method.

3. The method of claim 1, wherein the resin composition includes at least one (meth)acrylate monomer containing a (meth)acryloyl group, at least one urethane (meth)acrylate oligomer, and at least one photoinitiator.

4. The method of claim 3, wherein the curing rate of the preliminary adhesive member satisfies Equation 1 below:

$$Z_1=[(X_1-Y_1)/X_1]\times 100\% \qquad \text{[Equation 1]}$$

wherein, in Equation 1 above,
$X_1$ is an absorption amount of the (meth)acryloyl group measured by Fourier-transform infrared spectroscopy (FT-IR) in the resin composition, $Y_1$ is an absorption amount of the (meth)acryloyl group as measured by FT-IR in the preliminary adhesive member, and $Z_1$ is the curing rate of the preliminary adhesive member.

5. The method of claim 3, wherein a weight average molecular weight of the (meth)acrylate monomer is about 100 to about 500.

6. The method of claim 3, wherein a weight average molecular weight of the urethane (meth)acrylate oligomer is about 10,000 to about 40,000 (exclusive of 40,000).

7. The method of claim 3, wherein the urethane (meth)acrylate oligomer includes a plurality of acrylic groups.

8. The method of claim 3, wherein the photoinitiator includes a radical polymerization initiator.

9. The method of claim 1, wherein a light integral of the first light is about 200 mJ/cm$^2$ to about 1,000 mJ/cm$^2$, and a light integral of the second light is about 3,500 mJ/cm$^2$ to about 4,500 mJ/cm$^2$.

10. The method of claim 1, wherein the adhesive member has a 180 degree peel strength of about 800 gf/25 mm or more with respect to a polymer substrate.

11. The method of claim 1, wherein the adhesive member has a curing rate of greater than 90%.

12. A method of manufacturing a display device comprising:
    providing, on a substrate, a resin composition having a viscosity of about 5 cP to about 50 cP (exclusive of 50), as measured according to a JISK2283 method, at about 25° C.;
    exposing the resin composition to a first light to form a preliminary adhesive member having a curing rate of about 80% to about 98% (exclusive of 80 and 98);
    providing a protective member on the preliminary adhesive member; and
    exposing the preliminary adhesive member to a second light having a light integral that is greater than that of the first light to form an adhesive member,
    wherein the preliminary adhesive member has a loss tangent (tan δ) of about 0.2 to about 0.6 (exclusive of 0.6), and the adhesive member has a glass transition temperature of about −70° C. to about −30° C. (exclusive of −30).

13. The method of claim 12, wherein the second light passes through the protective member and exposes the preliminary adhesive member.

14. The method of claim 12, wherein the resin composition includes at least one (meth)acrylate monomer, at least one urethane (meth)acrylate oligomer, and at least one photoinitiator.

* * * * *